United States Patent
Dwier et al.

(10) Patent No.: US 11,623,759 B2
(45) Date of Patent: Apr. 11, 2023

(54) FUEL RECIRCULATION SYSTEM

(71) Applicant: Textron Aviation Inc., Wichita, KS (US)

(72) Inventors: Thomas Edward Dwier, Wichita, KS (US); Robert G. Wellemeyer, Derby, KS (US)

(73) Assignee: Textron Aviation Inc., Wichita, KS (US)

( * ) Notice: Subject to any disclaimer, the term of this patent is extended or adjusted under 35 U.S.C. 154(b) by 242 days.

(21) Appl. No.: 16/669,868

(22) Filed: Oct. 31, 2019

(65) Prior Publication Data

US 2021/0016892 A1 Jan. 21, 2021

Related U.S. Application Data

(60) Provisional application No. 62/876,122, filed on Jul. 19, 2019.

(51) Int. Cl.
*B64D 37/34* (2006.01)
*B64C 3/14* (2006.01)
*B64D 37/04* (2006.01)

(52) U.S. Cl.
CPC ............... *B64D 37/34* (2013.01); *B64C 3/14* (2013.01); *B64D 37/04* (2013.01); *B64C 2003/143* (2013.01)

(58) Field of Classification Search
CPC ........ B64D 37/34; B64D 37/04; B64D 37/20; B64D 37/14
See application file for complete search history.

(56) References Cited

U.S. PATENT DOCUMENTS

| | | | |
|---|---|---|---|
| 2,930,553 A | 3/1960 | Greenough | |
| 5,121,598 A | 6/1992 | Butler | |
| 6,343,465 B1 | 2/2002 | Martinov | |
| 9,309,000 B2 * | 4/2016 | Piesker | B64D 13/06 |
| 10,421,555 B2 * | 9/2019 | Morgan | B64D 37/08 |
| 2005/0139727 A1 * | 6/2005 | Wozniak | B64D 37/00 244/135 C |
| 2012/0298593 A1 * | 11/2012 | Buchholz | B64D 37/34 210/767 |
| 2015/0041004 A1 * | 2/2015 | Komoda | B64C 3/34 137/565.01 |
| 2015/0151845 A1 | 6/2015 | Jones | |
| 2015/0217153 A1 | 8/2015 | Jones | |
| 2021/0229827 A1 * | 7/2021 | Doman | F02C 7/224 |

FOREIGN PATENT DOCUMENTS

GB 2557302 A * 6/2018 ............ B64D 37/06

* cited by examiner

*Primary Examiner* — Timothy D Collins
*Assistant Examiner* — Terri L Filosi
(74) *Attorney, Agent, or Firm* — Avek IP, LLC

(57) ABSTRACT

Disclosed are systems and methods for maintaining bulk fuel temperatures in an aircraft. In one aspect, a recirculation system causes fuel to be delivered from a relatively low point near the feed hopper of each tank on the aircraft to one or more outboard locations of the wings. Once there, the fuel, due to gravity, flows back over the lower skin of the wing in channels back towards the fuselage, thus cooling the fuel. In other aspects, control systems are disclosed that coordinate the recirculation based on fuel levels in the tanks and fuel temperatures. The control systems also utilize a fuel scavenge system to maintain acceptable temperatures in the tanks.

19 Claims, 18 Drawing Sheets

FUEL RECIRCULATION SYSTEM

CROSS-REFERENCE TO RELATED APPLICATIONS

This application claims the benefit of U.S. Provisional Application No. 62/876,122 filed on Jul. 19, 2019.

BACKGROUND

1. Field

Embodiments of this disclosure relate generally to the field of aircraft fuel systems, and more specifically to a fuel recirculation system to cool the bulk fuel temperature.

2. Description of the Related Art

Elevated temperatures in fuel systems of aircraft as well as in other sorts of vehicles can be dangerous and increase the likelihood of unintended ignition of fuel within the system. It is known in the art to cool fuel to reduce flammability, e.g., see U.S. Patent Application Publication Nos. 2015/0151845 and 2015/0217153, both made by Jones. These publications disclose fuel cooling circuits that pump fuel from a tank through a heat exchanger, and then return the cooled fuel to the tank. A control system including temperature sensors start and stop the flow of fuel through the fuel cooling circuit.

U.S. Pat. No. 5,121,598 to Butler discloses a heat management system adapted to dissipate heat from and exchange heat between an aircraft's fuel and oil systems. Butler further discloses using the recirculation of fuel back to the wing tank following heat exchange with the engine oil system, fan air through the air bleed system of the engine, and dissipation of heat through the fuel tanks which are located in the aircraft's wings during flight.

U.S. Pat. No. 6,343,465 to Martinov discloses providing cooler air via ducting for removing excess heat from the fuel tank for reducing flammability potential. Specifically, ducting from engine intake suction is provided to remove heat from the exterior of the fuel tank and replace it with cooler outside air or mechanically refrigerated air.

U.S. Pat. No. 2,930,553 to Greenough describes an aircraft cooling method in which fuel is cooled in an aircraft tanker. Specifically, cold external air is passed through a heat exchanger and used to cool fuel in the fuel tank.

SUMMARY

Disclosed are a fuel system including controls along with related processes. In embodiments, the system includes a fuel-temperature-control system for maintaining fuel temperatures in the fuel system, the fuel temperature-control system including a controller. In the embodiment, a temperature-reading device located in the fuel system, and a circulation-flow subsystem is incorporated. The circulation-flow delivery subsystem is adapted to deliver fuel to a heat-dissipating medium associated with the fuel system. A return arrangement is also provided for returning fuel from the heat-dissipating medium. The controller is configured to activate the circulation-flow delivery subsystem upon the detection of a first reading made by the temperature-reading device, the first reading being reflective of a first fuel temperature which is either greater than or equal to a predetermined temperature maximum, the predetermined temperature maximum reflecting a fuel-cooling need.

In embodiments, the controller is also configured to deactivate the circulation-flow delivery subsystem detection of a second reading made by the temperature-reading device, the second reading reflecting a second temperature which is either less than or equal to a predetermined temperature minimum, and the predetermined temperature minimum being reflective of a fuel-warming need.

In embodiments, the fuel system also includes a scavenge system that draws fuel from one or more low points in a fuel vessel in the fuel system for the purpose of maintaining a steady source of fuel in a feed hopper. In the embodiments disclosed, a level-reading device is included in the fuel vessel, and the controller is configured to bring the scavenge system from an inactive state to an active state upon detection that a fuel level is either equal to or has fallen below a predetermined minimum level.

In embodiments, the controller is being configured to, when the engine is operating, determine whether a boost pump is operating as a primary source of fuel for the engine, and if the boost pump is operational, turning off either or both the scavenge system or the circulation-flow delivery device if either or both are on.

The circulation-flow delivery subsystem can include a pump, and in some embodiments, the pump is dedicated to the delivery of fuel to a heat-dissipating medium. Also, the fuel system can include a junction where motive flow from the engine is made to be combinable with the fuel being delivered to the heat-dissipating medium. In these embodiments, a modulation process can be operated on the controller where upon a plurality of subsequent fuel temperature readings, there can be an increase in flow of the fuel being delivered to the heat-dissipating medium relative to the amount of motive flow upon elevated temperature detections. Additionally, upon low temperature detections, decreases in the flow to the heat-dissipating medium can be made relative to the amount of motive flow.

In some embodiments, the heat-dissipating medium is an aircraft skin, and more specifically, can be the aircraft skin is located on the underside of an aircraft wing, and even more specifically, can define the internal surfaces of a fuel tank.

In embodiments, the circulation-flow delivery subsystem includes a fuel conduit that runs from a lower location in the fuel tank and delivers the fuel to an outboard location inside the fuel tank. Further, the fuel flows back towards the lower location under the influence of gravity in embodiments. And in some embodiments, the fuel flows back towards the lower location through at least one channel being at least partially defined by longitudinally-extending structural configurations rising from the lower skin of the wing.

In alternative embodiments, a method for maintaining temperatures in an aircraft is disclosed where the aircraft having symmetrical fuel tanks, and each tank being defined by the internal surfaces of a wing. According to embodiments of this method, on detection of an elevated fuel temperature, the process circulates fuel to outer regions in each fuel tank such that the fuel flows back from the outer regions to low points in each tank. Thus, a lower portion of each wing dissipates heat from the fuel being circulated. Additionally, the process might involve maintaining a fuel scavenge system in an off state, and activating the fuel scavenge system upon the detection of a fuel level in either of the tanks falling below a preselected minimum.

In another alternative embodiment, a control process is disclosed for maintaining acceptable fuel temperatures in a fuel system, the system including a scavenging system, the scavenging system when subjected to motive flow from an engine (i) operating at least one extraction pump; and (ii) returning the motive fuel to a fuel tank. The process comprises beginning with motive flow to the scavenging system turned off; continually reading a fuel level in the fuel tank; and activating the scavenge system by opening up motive flow to a conduit feeding the scavenge system upon receiving a first level indication reflecting the fuel level has reached or fallen below a predetermined minimum level. Additionally, the process can include deactivating the scavenge system by stopping motive flow upon the fuel level in the fuel supply tank rising back above the predetermined minimum level or some other predetermined level. The control processes might also involve disposing a valve in the conduit feeding the scavenge system for the purpose of executing the activating and deactivating steps. Additionally, the processes might include continually reading temperatures of fuel in the tank; and activating the scavenge system if the temperature reaches a predetermined minimum temperature even if the fuel level remains above the predetermined minimum level.

BRIEF DESCRIPTION OF THE SEVERAL VIEWS OF THE DRAWINGS

Illustrative embodiments of the present disclosure are described in detail below with reference to the attached drawing figures, which are incorporated by reference herein and wherein.

DETAILED DESCRIPTION

Embodiments of the present disclosure provide systems and methods for recirculating fuel within a wing of an aircraft for the purpose of lowering the temperature of the fuel. Portions of the wing exposed to external air flow experience a natural cooling effect, which may be used to cool fuel contained within the wing. Embodiments disclosed herein serve to maintain and/or reduce bulk fuel temperature below a lower flammability limit (e.g., jet fuel typically has a flash point of more than 38 degrees Celsius or 100 degrees Fahrenheit) by using the skin surface on the underside of the wing as a heat exchanger for the purpose of reducing fuel tank flammability. Thus, the skin on the underside of the wing acts as a heat-dissipation medium.

Figure 1:
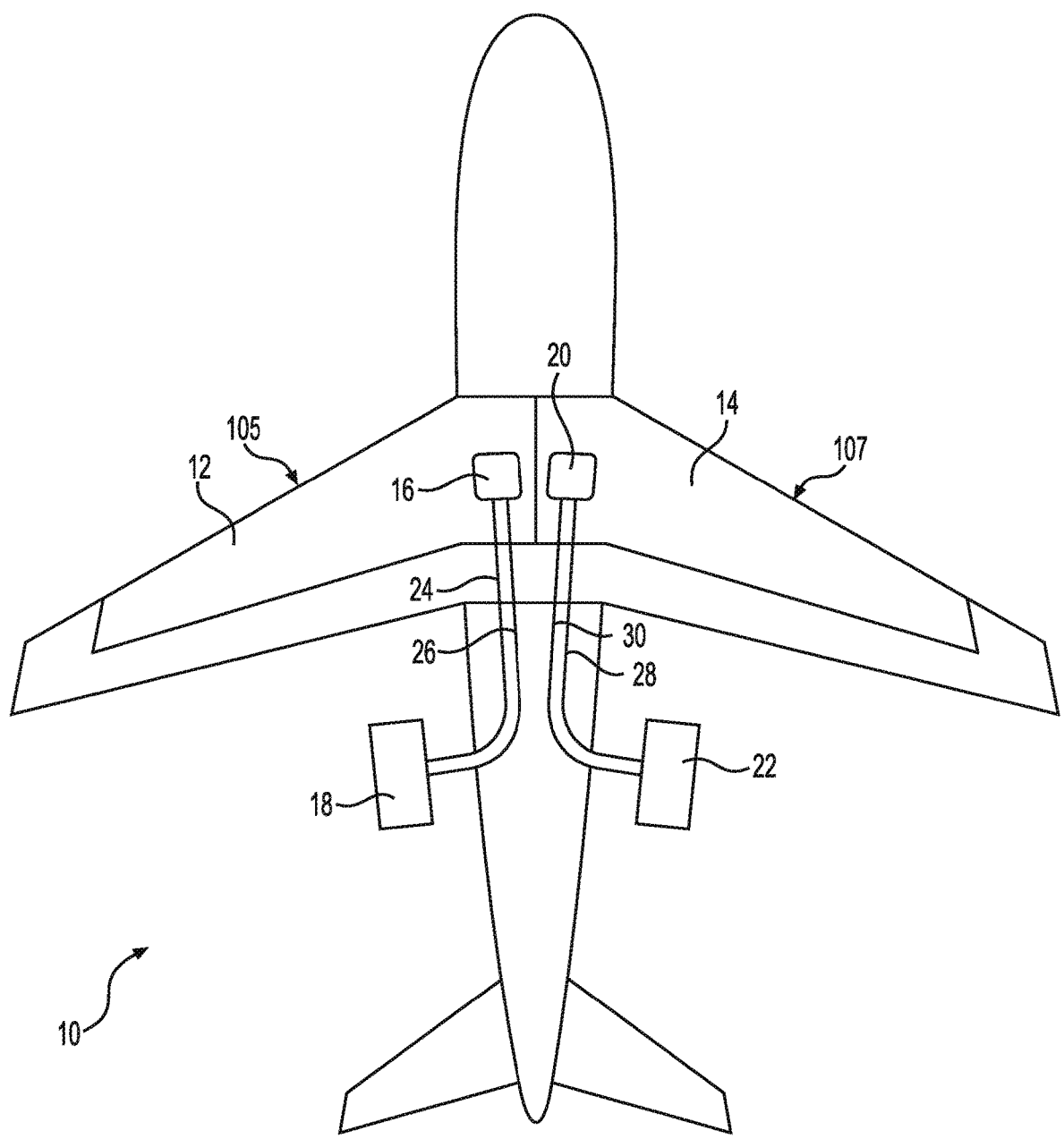
FIG. 1 is a schematic diagram illustrating a top down view of a typical aircraft and related systems.

FIG. 1 is a top-down schematic diagram of an exemplary aircraft in which the systems and methods of the present invention might be employed. Those skilled in the art will recognize that the drawing has been simplified, drawing out the systems most relevant. Referring to the figure, an aircraft 10 includes a left wing 105 and a right wing 107. The two wing structures, and associated fuel tank systems are largely symmetrical across the center line of the aircraft. The fuel storage systems include a left tank 12, and a right tank 14. Nearer the center of the aircraft, each of wing tanks 12 and 14 have fuel delivery systems which are typically included in feed hoppers 16 and 20 respectively. The fuel delivery system in feed hopper 16 supplies fuel to the left engine 18, and the fuel delivery system in the right feed hopper 20 supplies fuel to the right engine 22. Those skilled in the art will recognize that numerous different fuel delivery systems are currently in use on aircraft, and although some examples will be included hereinafter, the scope of the invention should not be limited to any particular arrangement. A main fuel supply line 24 extends between the feed hopper 16 and the left engine 18, and a motive fuel line 26 returns hot unused fuel under pressure from the engine back to the left tank 12 (feed hopper 16). Similarly, for right engine 22, a main fuel line 28 extends from the feed hopper 20 to supply fuel to the right engine 22. Again, a motive fuel return line 30 brings back hot fuel from the right engine 22 back to the feed hopper 20 in the right tank 14.

Figure 2:
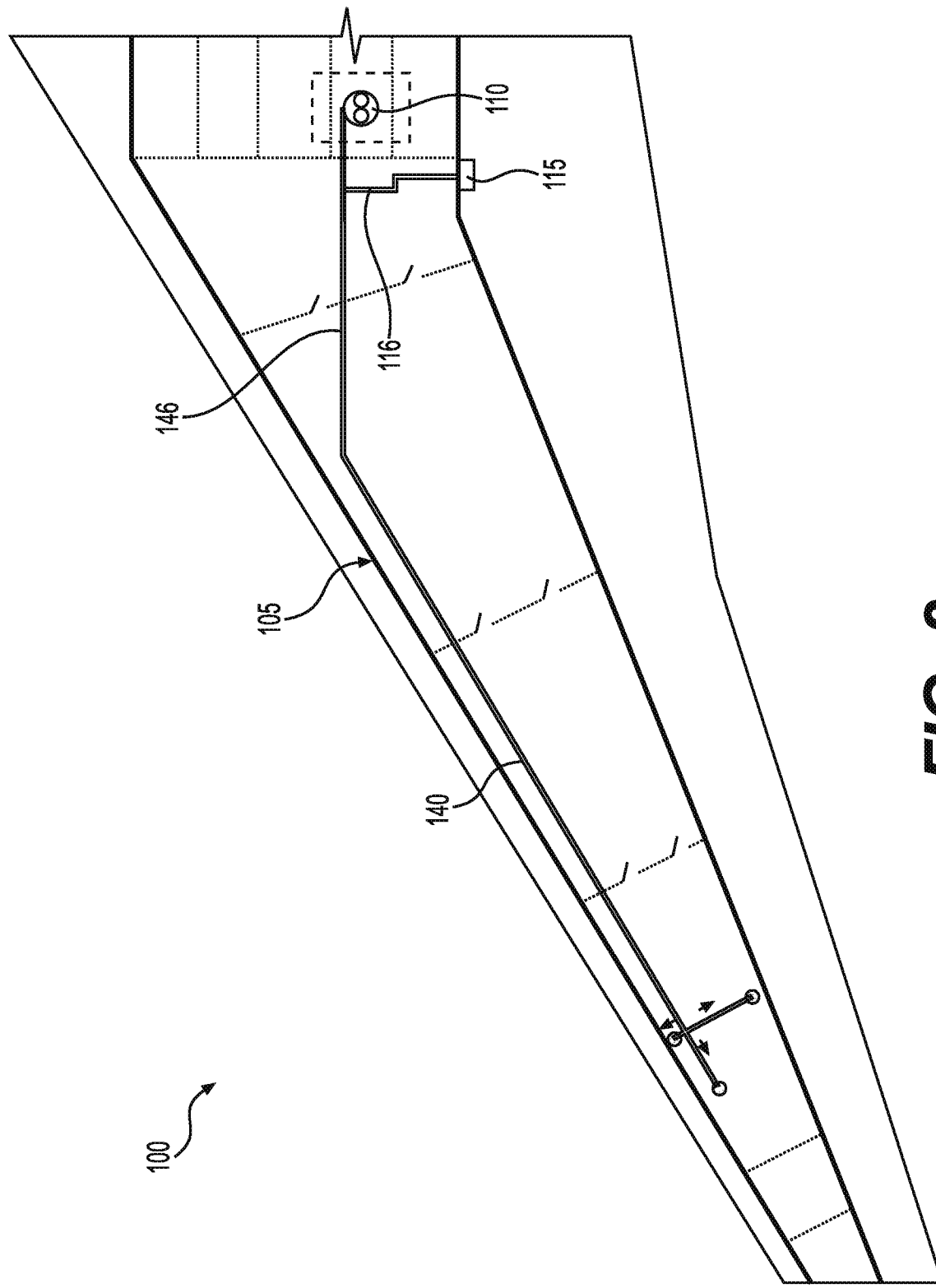
FIG. 2 is a schematic diagram of an embodiment illustrating a top down view of the fuel recirculation system incorporated within each side of the aircraft wing using one side as an example.

FIG. 2 is a schematic diagram illustrating a top down view of an aircraft wing 105 having an exemplary fuel recirculation system 100. System 100 is adapted to transport fuel from an inboard section of a fuel tank within wing 105 towards an outboard section of wing 105 (e.g., from a section below the fuselage towards the wing tip). Fuel flows from outlets created at the outer regions of the wing, exchanges heat through the lower skin into the outside air as it flows back inboard, and then is received back into the bulk fuel pooled at the more inboard, lower regions of the tank. Fuel recirculation system 100 may be duplicated and employed on both the left and right wings of an aircraft, and the duplicate fuel recirculation systems may operate independently. In certain embodiments described below, system 100 includes a recirculation pump 110 as illustrated in FIG. 2.

In operation, gravity causes fuel deposited in an outboard section of the wing to flow downwardly towards an inboard section due to the dihedral angle of the wing (e.g., the wing angles upwardly as it extends outwardly from the fuselage). In this manner, the fuel is recirculated as it is pumped in an outboard direction followed by the fuel flowing in an inboard direction along a bottom of the fuel tank immediately adjacent a lower skin of the wing. Since the inboard portion of the lower wing skin may be located within a fairing, which reduces airflow, redistribution of fuel to the outboard portion of the wing is beneficial for cooling. As the level of fuel in the tank decreases during flight, the amount of exposed surface area on the lower wing skin increases, which improves the amount of cooling.

Alternatively, ducting may be used to circulate outside air to the fairing for cooling fuel at an inboard portion of the fuel tank or external fuel-air heat exchangers may be used; however, this may substantially increase drag on the aircraft, which is not the case with embodiments of the presently disclosed system.

Those skilled in the art will recognize that the fuel systems like those disclosed in FIG. 2 often are in cooperation with other exemplary aircraft fuel supply subsystems. These include tubing and pumps for engine motive flow (e.g., high-pressure fuel returned from the engine to the fuel tank to be used to drive ejector pumps), transfer between left and right wing fuel tanks, engine supply for left (L) and right (R) engines, refueling/defueling the aircraft via single point refueling (SPR), venting (e.g., maintaining the pressure inside the wing at acceptable levels), scavenging (e.g., ensuring fuel in the tank reaches pump pickup points for delivery to the engine), and gravity crossflow.

Figure 3:
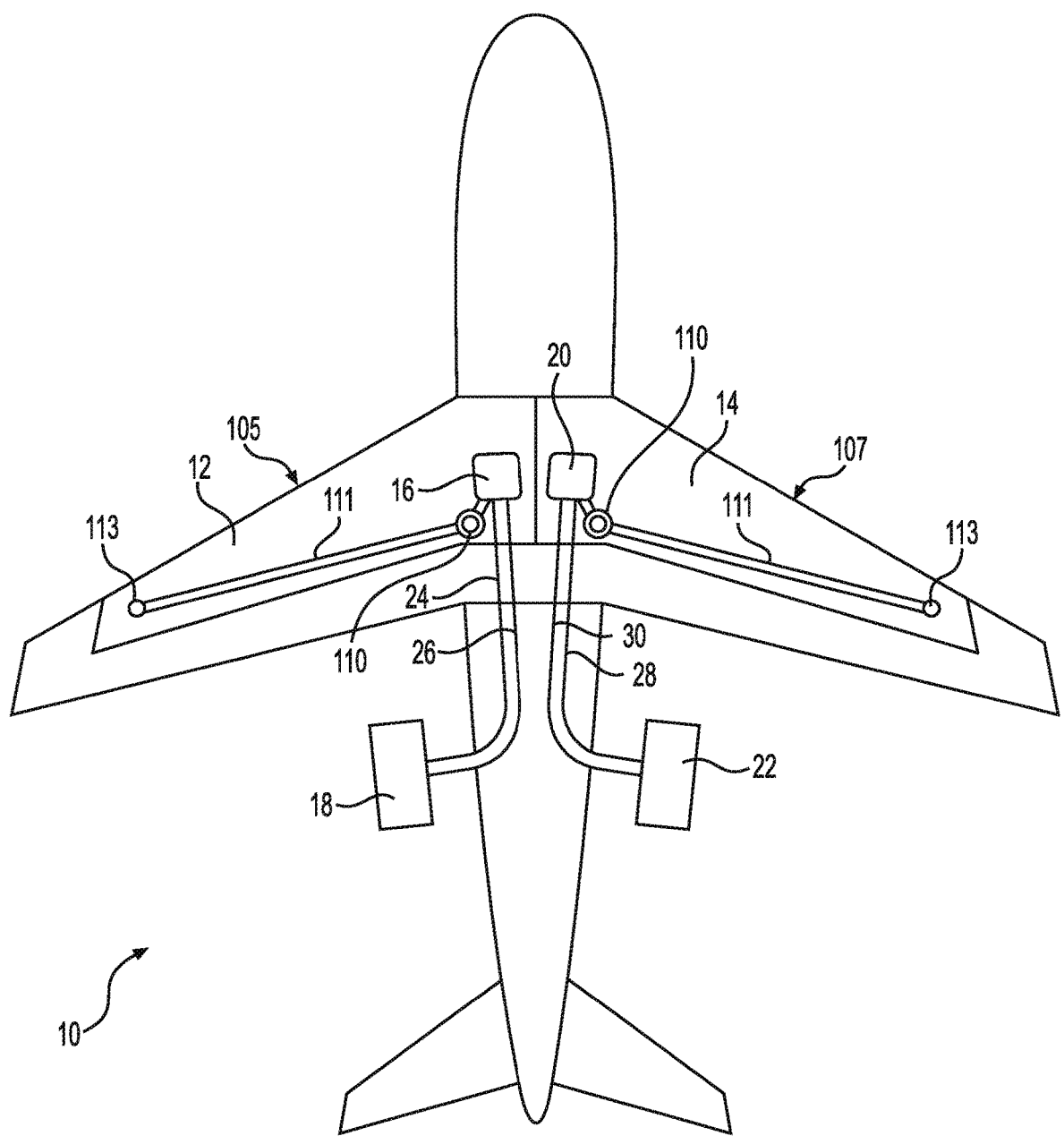
FIG. 3 shows a portion of a fuel recirculation system including a recirculation pump to redistribute fuel from the inboard section to the outboard section of the wing, in an embodiment.

FIG. 3 shows a portion of the symmetrical fuel recirculation system 100 including recirculation pumps 110 on each side of the aircraft, the pumps 110 added to redistribute fuel via outwardly-extending conduits 111 from the inboard sections to outlets 113 at each of the outboard sections of wings 105 and 107. Recirculation pumps 110 are, for example, electric boost fuel pumps dedicated to redistributing fuel as part of system 100. In certain embodiments, pump 110 may be located in a bay of wing 105 aft of an engine feed hopper.

In some embodiments, recirculation pump 110 distributes fuel through a fuel recirculation line 140. An exemplary fuel recirculation line 140 is made of thin-walled aircraft aluminum tubing. An amount of fuel pumped via pump 110 may be limited using an in-line orifice within the fuel line 140 (e.g., prior to any branches to smaller fuel lines). One or more check valves may be incorporated in fuel recirculation line 140 to prevent back flow.

Fuel recirculation line 140 may include more than one fuel line and/or more than one section of tubing that branch off of a main fuel line. For example, as depicted in FIG. 2, a fuel recirculation line extension 146 fluidly couples recirculation pump 110 to fuel recirculation line 140. In certain embodiments, such as system 600 described below in connection with FIG. 6, a fuel recirculation line 640 is an existing aircraft fuel line (e.g., a pressure refueling line) that is tied to recirculation pump 110 via fuel line extension 146. In certain embodiments, the fuel recirculation line (e.g., lines 140, 640, or 740) splits into a plurality of smaller fuel lines (e.g., lines 141-143 in FIGS. 5 and 6, and lines 741-745 in FIG. 7) for discharging fuel in a plurality of locations, which are further described below and depicted in FIGS. 5-7.

A pressure sense line 116 connects a pressure switch 115 (see FIG. 2) to fuel recirculation line 140. Pressure switch 115 provides pressure information to a controller 120, described below in connection with FIG. 4. Electrical wiring associated with pressure switch 115 is installed outside the fuel tank to avoid ignition hazard.

Figure 4:
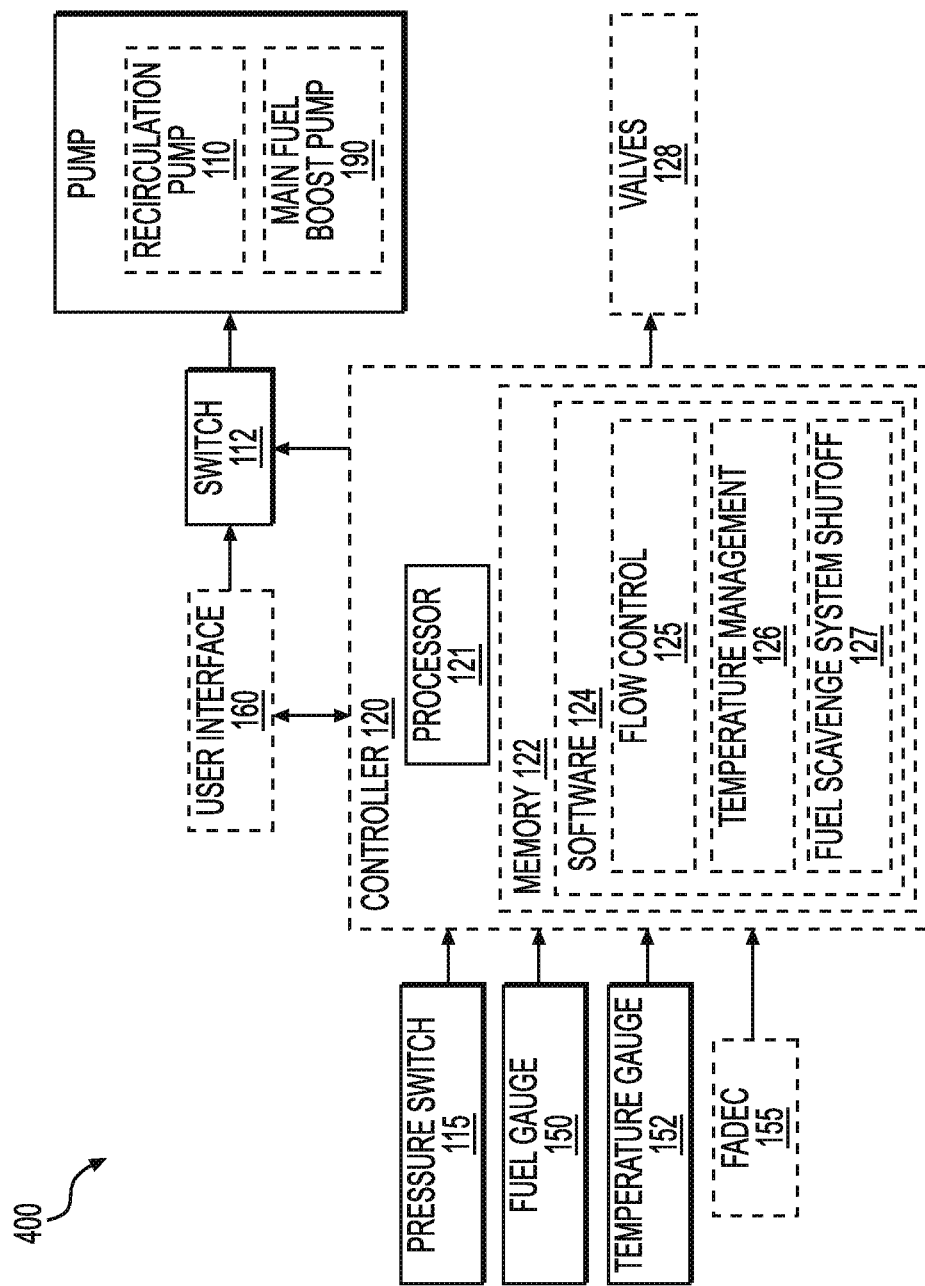
FIG. 4 is a block diagram of a control system architecture used for controlling flow of fuel in the fuel recirculation system of FIG. 1, in an embodiment.

FIG. 4 is a block diagram of a control system architecture 400 used for controlling flow of fuel in fuel recirculation system 100. A controller 120 includes a memory 122 for storing software 124 having machine readable instructions executed by a processor 121. Controller 120 is for example one or more of a server, a computer, a microcontroller, a programmable logic controller (PLC), or a printed circuit board. Memory 122 in some embodiments is a memory system that includes both transitory memory such as RAM and non-transitory memory such as, ROM, EEPROM, Flash-EEPROM, magnetic media including disk drives, and optical media. Memory 122 stores software 124 as machine readable instructions executable by processor 121. For example, software 124 may include instructions for flow control 125, instructions for temperature management 126, and instructions for fuel scavenge system shutoff 127, which are described below.

Controller 120 may optionally receive information from one or more of the following: pressure switch 115, a fuel gauge 150, a temperature gauge 152, or a full authority digital engine controller (FADEC) 155. Pressure switch 115 indicates when a threshold pressure has been reached. The fuel gauge 150 (representative of a plurality of gauges) provides fuel levels in one or more fuel tanks to the pilot and the controller 120. The temperature gauge 152 (again, representative of a plurality) provides bulk fuel temperatures in one or more fuel tanks to the pilot and the controller 120. The FADEC 155 may provide fuel pressure at the engine inlet or motive temperature, for example. A user interface 160 may optionally be provided for enabling a user (e.g., a pilot) to interact with the fuel recirculation system 100 including a capability for the user to manually control system 100, as described below. The user interface 160 may include any user input device including but not limited to a physical switch, a button, knob, keyboard, or touch screen, any of which may be used to control switch 112 for turning recirculation pump on/off.

In some embodiments, system 100 is manually controlled by a pilot without using controller 120. For example, user interface 160 enables the pilot to control switch 112 for turning recirculation pump 110 on or off as appropriate (e.g., based on information gleaned from fuel gauge 150 and/or temperature gauge 152).

Fuel temperature management may be necessary to control the bulk fuel temperature below a predetermined maximum temperature far enough below the lower flammability limit (LFL) for a fuel selected for use, and above a Minimum Fuel Temperature (MFT) limit (e.g., a temperature sufficiently above the fuel freezing point). In certain embodiments, controller 120, FIG. 4 is used to provide instructions for fuel temperature management 126 by monitoring fuel temperature at specific locations (e.g., via one or more temperature gauges 152) and controlling the amount of fuel recirculation via fuel circulation pump 110 (e.g., by turning pump 110 off and on). In some embodiments, heated motive flow fuel that flows from the engine back to the fuel tank may be used to halt fuel cooling and avoid fuel freezing. (See e.g., FIGS. 11A, 11B, 12, and 14 and their descriptions below). In other embodiments the heated motive flow fuel that indirectly supplies the scavenge system may be used to halt fuel cooling (see e.g., FIGS. 10 and 15).

Figure 5:
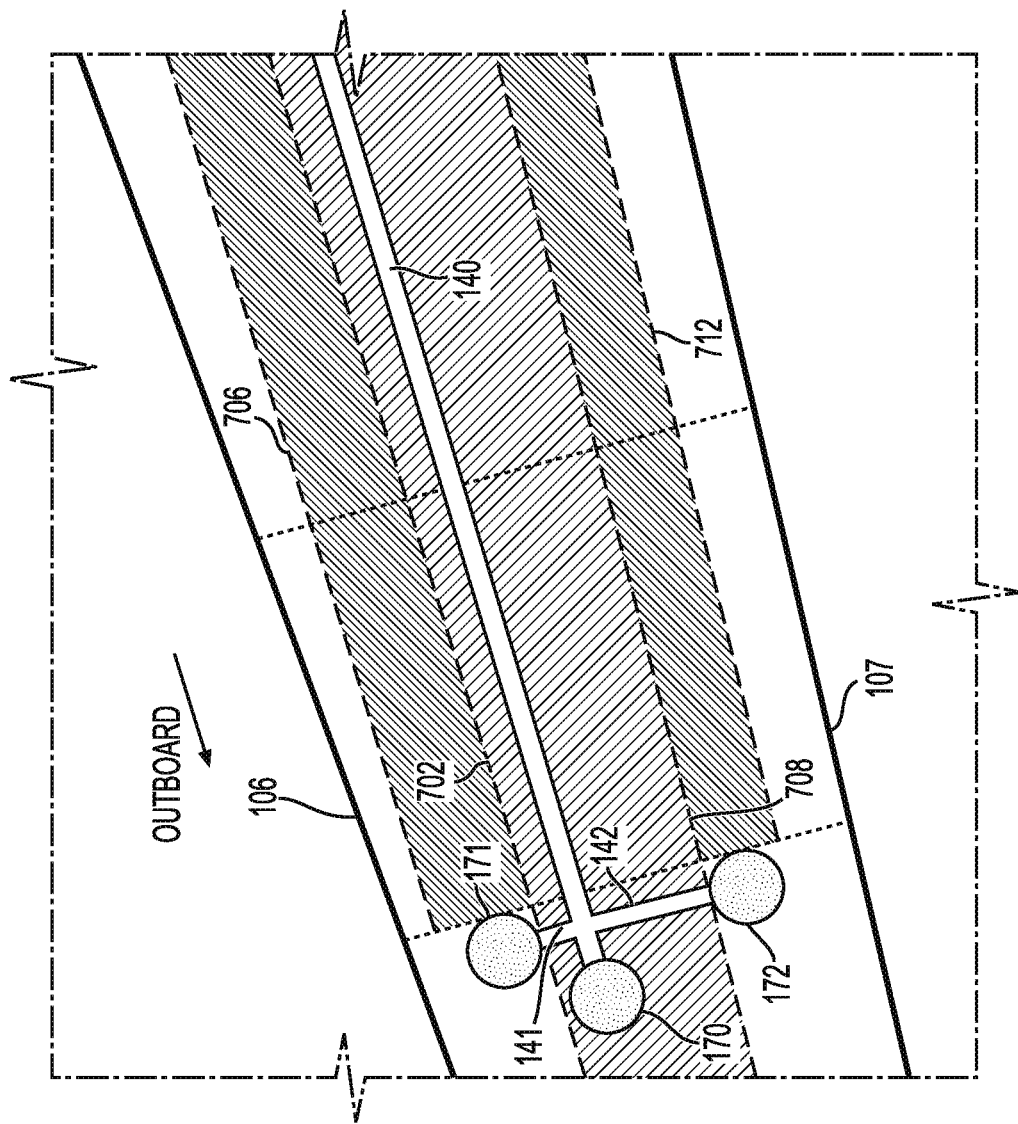
FIG. 5 shows portions of a fuel recirculation system from a top down view inside the wing, in an embodiment.

FIG. 5 provides a top down view inside wing 105 near the outboard portion of the wing. In some embodiments, the main fuel line 140 branches out into a plurality of smaller fuel lines, such as a first line 141, a second line 142, and a third line 143. Brackets and/or clamps may be used to attach the fuel lines to structural cross members in the wing (ribs in the disclosed embodiment) and to position outlets of the fuel lines near the wing lower surface. Each of fuel lines 141, 142, and 143 may have a corresponding outlet 170, 171, and 172, as depicted in FIG. 5. Each of outlets 170-172 may have an opening with a limited radius to act as a diffuser and limit velocity of fuel exiting a respective fuel line (e.g., first, second, and third fuel lines 141, 142, and 143. Each outlet may be positioned a predetermined distance away from the outer wing surface (e.g., about ¼ inch) to reduce mixing and aeration of the fuel, and to reduce static electricity to lessen ignition hazard.

The main fuel line 140 and the smaller lines 141-143 distribute fuel to a plurality of locations. For example, the plurality of locations may be positioned along the wing chord (e.g., at different positions between a leading edge 106 and a trailing edge 107 of the wing) for spreading fuel along the lower wing skin, as described below in connection with FIGS. 6 and 7.

Figure 6:
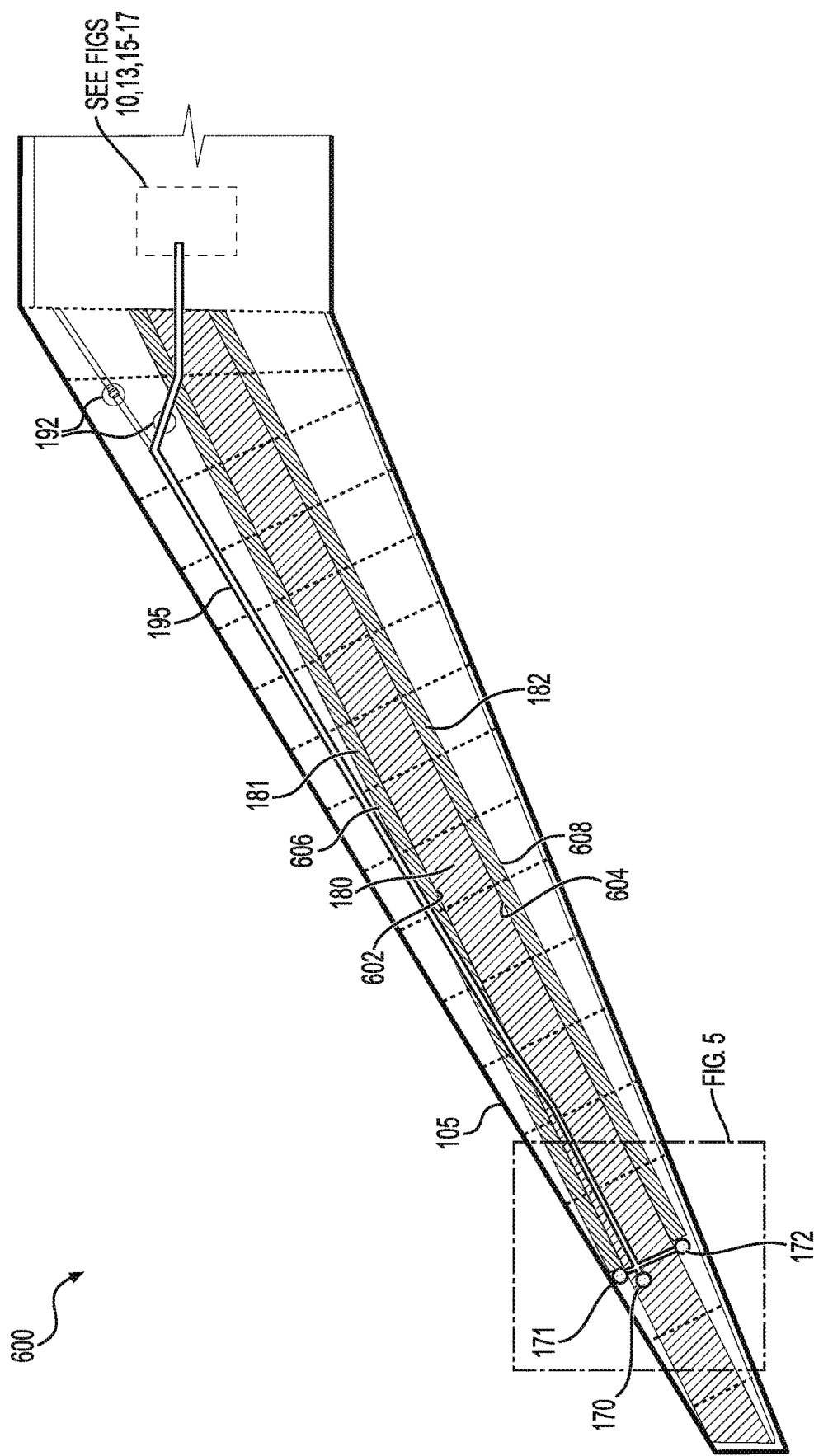
FIG. 6 shows another embodiment of a fuel recirculation system.

FIG. 6 shows a fuel recirculation system 600, which is an example of system 100, FIG. 1. Items enumerated with like numerals are the same or similar and their description may not be repeated accordingly. System 600 uses an existing refuel line 195 (instead of a dedicated recirculation fuel line 140 as in system 100) and pressure from the aircraft's main fuel boost pump 190 tone on each side of the aircraft) to transport fuel from the inboard section of wing 105 to the outboard section of the wing without requiring recirculation pump 110 of system 100. Alternatively, system 600 uses engine feed hopper pressure developed by scavenger ejector pump (see item 196 in FIGS. 10, 13, and 15-17; which is a schematic representation of either a system having one or multiple scavenger ejector pumps) instead of pressure generated by the main fuel boost pump 190. Check valves 192 prevent fuel or air from flowing back to main fuel boost pump 190 from refuel line 195. Control of fuel flow via system 600 may be performed by controller 120 of FIG. 4, similar to control of system 100.

Rather than using a dedicated recirculation pump 110 and a dedicated recirculation fuel line 140 (as in system 100), system 600 uses components that already exist onboard the aircraft. Refuel line 195 may be a pressure refueling line, for example. The main fuel boost pump 190 transports fuel from the fuel tank (e.g., from the engine feed hopper or collector tank) to an aircraft engine. For example, on the left side of the aircraft, main fuel boost pump 190 transports fuel from the left fuel tank to the left engine; similarly, the main fuel boost pump on the right side of the aircraft (not shown) transports fuel from the right fuel tank to the right engine.

As depicted in FIG. 6, fuel may be distributed to a plurality of channels. Each channel can be at least partially defined by longitudinally-extending structural configurations rising from the internal surfaces of the internal skin. In the disclosed embodiment, these structural configurations are stiffening stringers, which are commonly affixed atop the lower wing skin inside the wing. The channels direct fuel flow when the fuel level is below a height of the stringers. For example, fuel deposited by outlet 170 flows into and down a main channel 180, the opposing walls of which are defined by inside stringers 602 and 604, as the fuel flows due to gravity in the inboard direction. Additional stringer channels, such as a first additional channel 181 (defined between stringers 602 and 606) and a second additional channel 182 (defined between stringers 604 and 608) are adjacent main channel 180 on opposite sides and are fed by outlets 171, 172, respectively (see also FIG. 5). By distributing fuel to more than one channel, the effective surface area for cooling fuel is widened. As depicted in FIG. 6, outlets 170, 171, and 172 deposit fuel at or near a head (e.g., the outboard end of the wing) of their respective channels 180, 181, and 182, respectively. Although the embodiments depicted herein all show stringers being used to define the channels, those skilled in the art will recognize that spars and possibly other structural elements could be used to do so.

Figure 7:
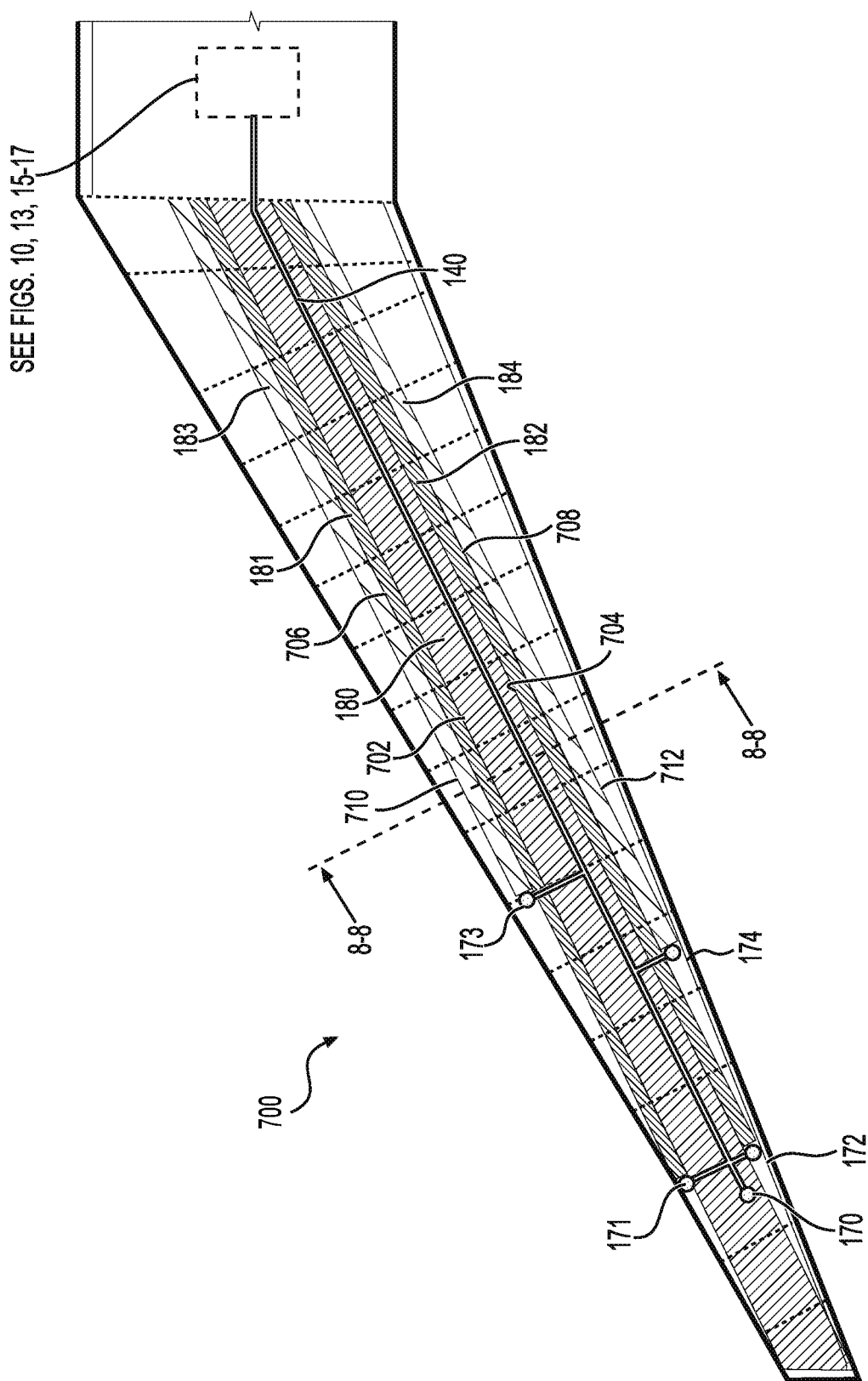
FIG. 7 shows yet another embodiment of a fuel recirculation system.

FIG. 7 shows a fuel recirculation system 700, which is an example of system 100, FIG. 1. Items enumerated with like numerals are the same or similar and their description may not be repeated accordingly. System 700 uses recirculation pump 110 to pump fuel through recirculation fuel line 140. Like with FIG. 6, the FIG. 7 embodiment also includes a central channel 180 defined by stringers 702 and 704, two lateral channels 181 and 182 outside that, defined by stringers 702 and 706, and stringers 704 and 708, respectively. FIG. 7 also depicts third and fourth additional channels 183 and 184 existing laterally outside the inner three channels 180, 181, and 182. Channel 183 is defined between stringers 706 and 710, and Channel 184 is defined between stringers 708 and 712. The addition of two extra channels, based on wing divergence (leading edge versus trailing edge) allows for direction of fuel flow along an even wider portion of the lower wing skin. The additional channels 183 and 184 receive fuel from additional branches off recirculation fuel line 140 via outlets 173, 174, respectively.

Figure 8:
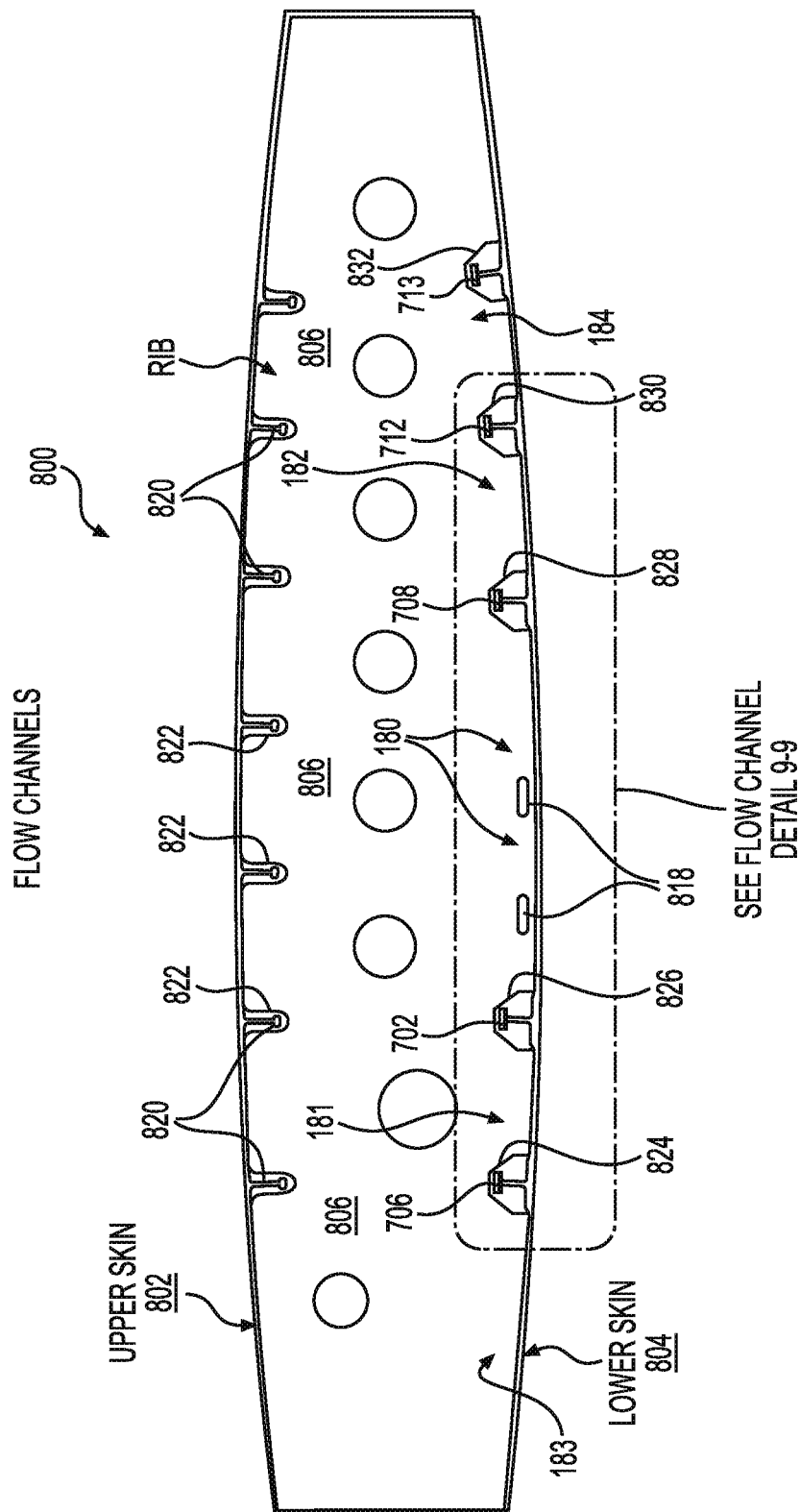
FIG. 8 shows as section 8-8 taken from FIG. 7.

FIG. 8 shows a cross sectional view taken at Section 8-8 shown in FIG. 7. Referring to the figure, a cross section 800 reveals both an upper skin 802 and a lower skin 804 of the wing. The section also provides an internal view of a cross member 806 as often exists to provide structural integrity in a dimension perpendicular to that provided by the stringers. In the disclosed embodiment, cross member 806 is a rib in an aircraft wing. This rib 806 oftentimes includes apertures 807 designed to, e.g., reduce weight, material consumption, etc. Also seen in the FIG. 8 is how the stringers 702, 706, 708, 712, and 713 appear in cross-section. Also, near the lower skin 804 are flow cutouts 818 which have been added. Comparing the lower stringers 702, 706, 708, 712, and 713 against the upper stringers 820, it can be seen that the rib (as well as the other ribs not shown) have been cut out leaving apertures (e.g., holes). The apertures 822 for the upper stringers 820 have not been modified. The lower stringer apertures 824, 826, 828, 830, and 832, however, have been enlarged to enable more flow through the rib 806. The flow cutouts 818 also increase flow. Although not shown, it should be understood that all of the ribs in the areas of the wing where flow paths exist are similarly modified like the one in FIG. 8.

In terms of flow channels, at the section shown in FIG. 8, channel 183 is at its head before the outer stringer begins. But it should be understood that the flow would exist where noted in the figure. The unfilled spaces in which flow channels 181, 180, 182, and 184 will exist are clearly shown in the figure. All will be defined between stringers.

Figure 9:
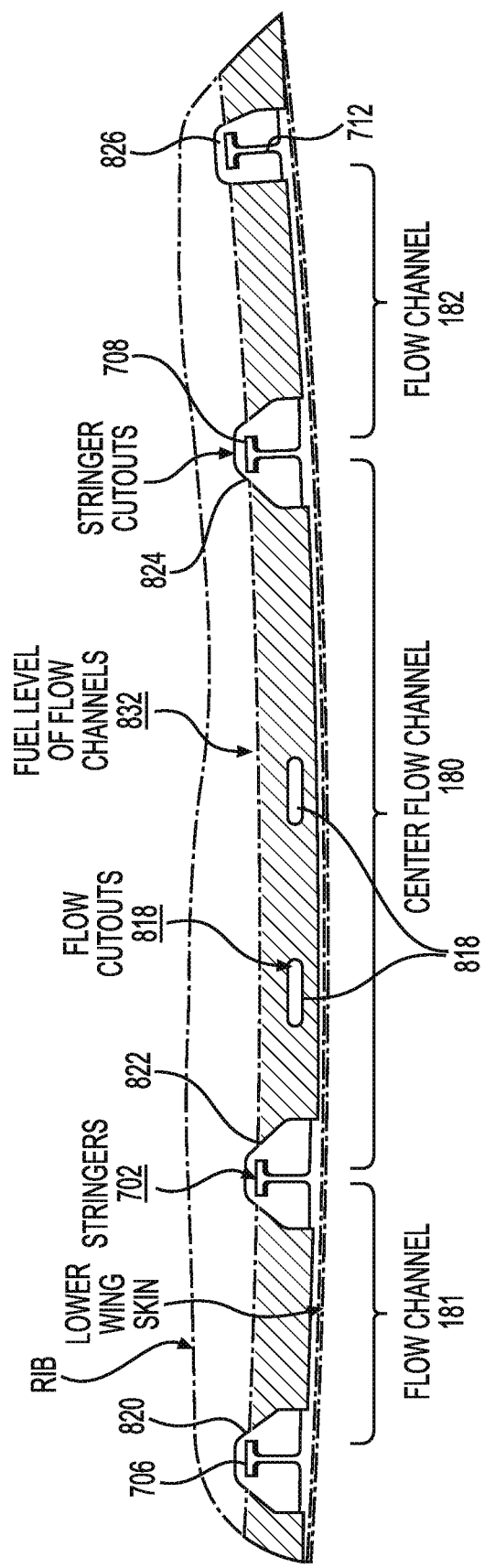
FIG. 9 shows a breakout section 9-9 taken from FIG. 8.

FIG. 9 shows the broken out section 9-9 taken from FIG. 8 in detail, and with flow channels being utilized to include a fuel level 832 revealed. It should be noted that the flow will be into the page, and that the flow cutouts 818 and the enlarged stringer apertures 820, 822, 824, and 826 greatly assist in allowing for more recirculation flow.

FIGS. 10, 13, and 15-17 show different embodiments employed to supply fuel for either of system 600 of FIG. 6 (e.g., via refuel line 195) or system 700 of FIG. 7 (e.g., via recirculation line 740). FIGS. 11A, 11B, 12, and 14 show processes operated along with those systems for the purpose of maintaining acceptable bulk fuel temperatures.

A fuel scavenge system provides flow from potential low points in the fuel tank to the engine feed hopper, which is a fuel collector tank shown in FIGS. 10, 13, and 15-17. The scavenge system ensures that the engine feed hopper remains full as long as there is usable fuel in the tank. Conventionally, the scavenge system is typically allowed to run anytime the engine is running. The disclosed embodiments however reveal a system and method where the scavenge system is strategically made to be inoperable until the fuel level reaches a low level.

As those skilled in the art will recognize, systems incorporating at least one motive-flow driven ejector pump in the feed hopper as the means to fuel the engine (e.g., like in the systems shown in FIGS. 10 and 15) also typically have scavenging ejector pumps which receive a portion of the motive flow after it leaves the primary ejector. Thus, this flow tapped out is a mix of main and motive fuels, but still exists at relatively high temperatures because the motive fuel has returned from the engine. This diverted fuel is directed into numerous ejector pumps. These pumps are configured to draw fuel from low points in the fuel tank using at least one of scavenge ejector pump, but most likely a plurality of scavenge ejector pumps, each which are driven using the motive mix. Once the fuel passes through the scavenge system pumps (still at relatively high temperatures), the fuel goes into the hopper, mixing with the bulk fuel. This return of motive fuel increases the bulk fuel temperature.

Figure 10:
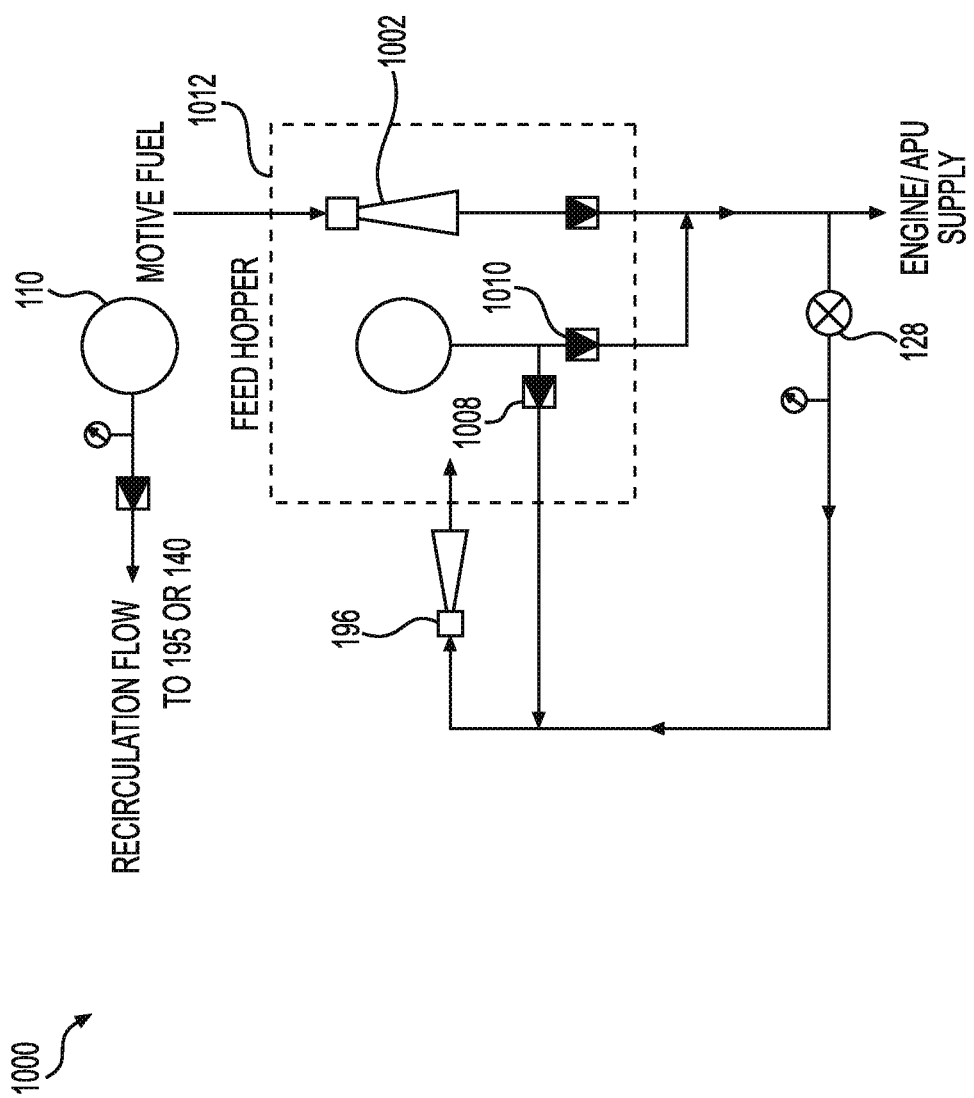
FIG. 10 shows an embodiment of a fuel supply architecture for supplying fuel to either of the fuel recirculation systems of FIG. 6 and FIG. 7.
Figure 15:
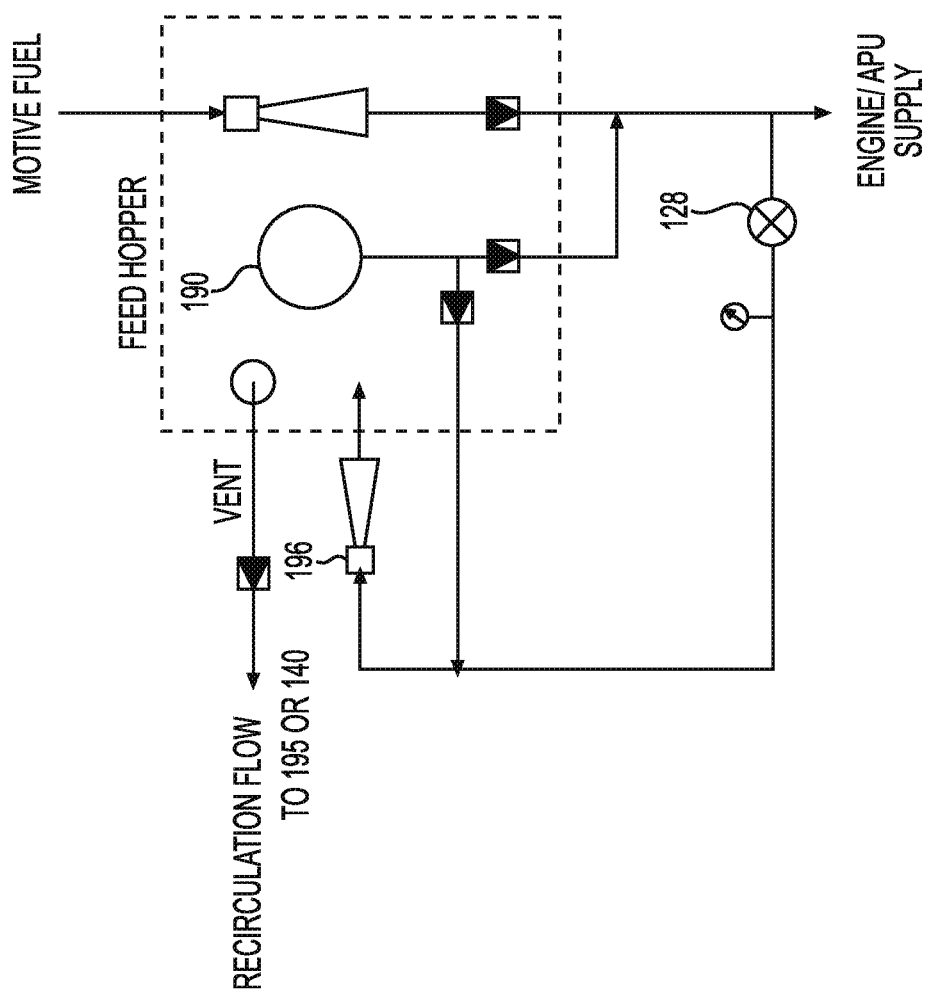
FIG. 15 shows yet another embodiment of a fuel supply architecture for supplying fuel to either of the fuel recirculation systems of FIG. 6 and FIG. 7.

In certain embodiments (again, the systems of FIGS. 10 and 15 are examples), controller 120 is adapted to shutoff the fuel scavenge system until the fuel level in the tank drops to a predetermined level. Shutting off the fuel scavenge system prevents the hot engine-supplied motive flow fuel from circulating back into the feed hopper collection tank. One or more fuel scavenge shutoff valves 128 may be provided (e.g., see FIGS. 10 and 15) and a separate level sensor (not shown in the two figures) may provide fuel level information to controller 120. Fuel scavenge shutoff valve 128 may be controlled by controller 120 via fuel scavenge system shutoff instructions 127. Details regarding the scavenge shut off process running on controller 120 will be discussed hereinafter.

FIG. 10 depicts a fuel temperature control system 1000 including a dedicated recirculation pump 110 drawing bulk fuel out of the fuel tank, and then supplying recirculation flow to fuel recirculation line 740 (see e.g., FIG. 7) or refuel line 195 (see e.g., FIG. 6). As can be seen in FIG. 10, the recirculation pump 110 and means for delivering the recirculated fuel to the outer regions of the wing are separate from the fuel delivery systems, e.g., the main fuel supply ejector pump 1002, check valve 1004, main fuel boost pump 190, check valves 1008 and 1010, the one or more scavenger ejector pump 196, and scavenger shut off valve 128. The one or more scavenger ejector pump 196 supply scavenged fuel from low points in the fuel tank to the engine feed hopper 1012. The scavenge shutoff valve 128 may be used to minimize the heat transfer into the bulk fuel, at the direction of the scavenge shutoff valve 128 via software instructions 127 which are executed by the controller 120 (see FIG. 4).

In operation of system 1000, when an aircraft engine is running and that engine's main boost pump 190 is off, recirculation pump 110 in the respective wing is automatically turned on. Conversely, when main fuel boost pump 190 is on, recirculation pump 110 is turned off. When an engine turns off, the respective recirculation pump 110 is turned off. When the fuel level in the fuel tank falls below a predetermined threshold, recirculation pump 110 may also be turned off.

Figure 11A:
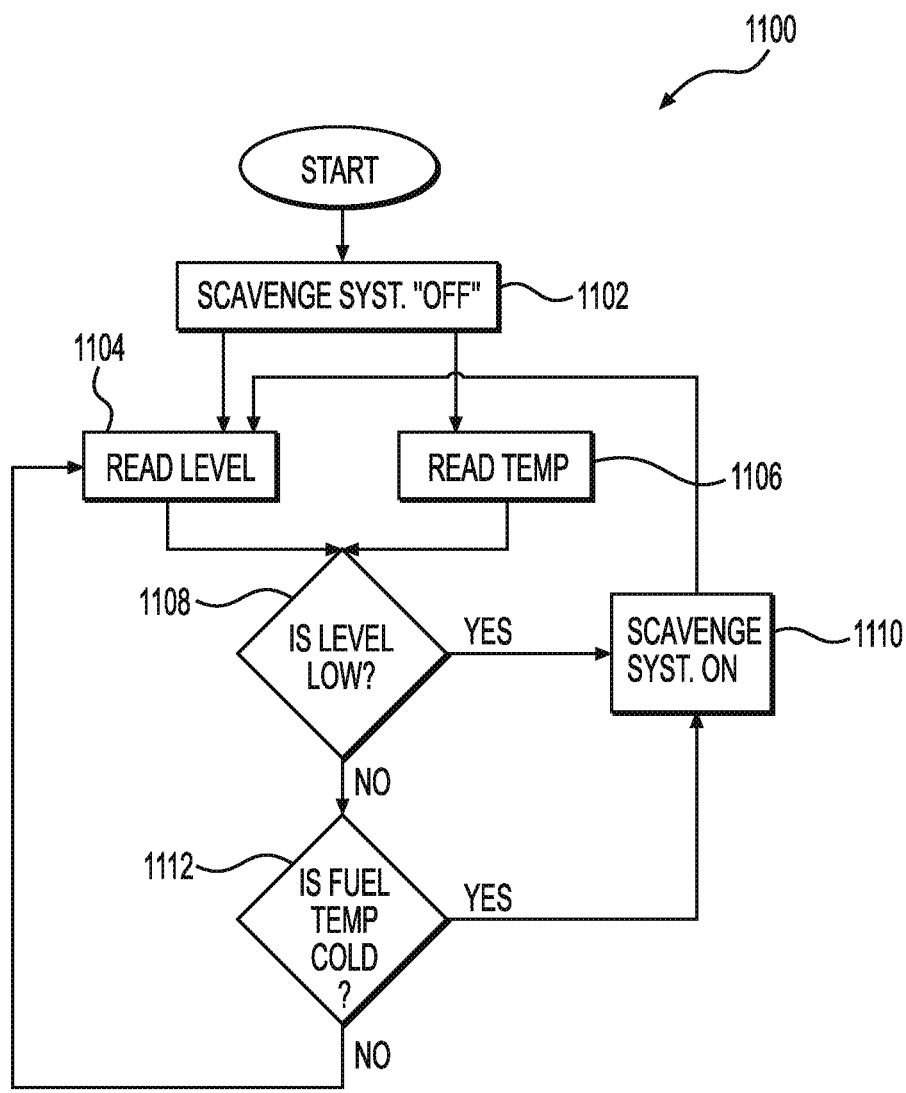
FIG. 11A is a flow diagram representing a high-level process for controlling a scavenge system like the ones depicted in FIGS. 10 and 15.

FIG. 11A depicts an embodiment for a process running on the processor 121 in the controller 120 useful to maintain bulk fuel temperatures at acceptable levels. The process manages the scavenge system of the system of claim 10. The processes shown in FIG. 11A are optionally stored as instructions included in the software 124. The process includes a method 1100 (see FIG. 11A) for controlling the state of the scavenge system valve 128.

After starting, the method 1100 includes a first step 1102 where the scavenge system begins at an "off" setting. As will be recalled from the above, with conventional systems where a main ejector is utilized as the primary fuel pump, the scavenge system simply runs continually. Here, however, the initial setting is "off", and the fuel scavenge system shut off instructions 127 are configured to accomplish that using the scavenge shut off valve 128 (see FIG. 10). Because the scavenge system begins with valve 128 being closed, there is no flow to the scavenger ejector pump 196, and thus, no hot motive fuel mix is thereafter dumped into the feed hopper 1012. In next parallel steps 1104 and 1106, instructions running on processer 121 of controller 120 cause the reading of fuel levels and temperatures of the fuel in the tank, respectively. This is done using readings from the pressure switch 115 and the temperature gauge 152.

There are two situations where it is desirable to activate the scavenge system, and the first is critical since when the bulk fuel level is low, the scavenge system is necessary to preserve ample fuel in the feed hopper to maintain flow continuity. To that end, in a next step 1108, an inquiry is made as to whether the fuel level is below a minimum. Again, in the relevant conventional systems, the scavenge system is not actively controlled during flight, and is always on. It has been discovered, however, that by not using the scavenge system except during times of need, the increase in bulk fuel temperature can be significantly reduced during operation of the aircraft. As a preliminary to step 1108, a minimum fuel level is determined at which the scavenge system, including the use of motive fuel driven extraction pumps 196, becomes necessary. E.g., this limit might be set at a 500 lb fuel level limit for an aircraft tank system having a 10,000 lb capacity based on concerns that fuel delivery would lose continuity. If, in step 1108, it is determined that the fuel level has dropped below the minimum predetermined level (e.g., 500 lb), the process 1100 moves on to a step 1110 where the fuel scavenge system is turned "on". This involves the processor 121 opening up the scavenge on/off valve 128. Generally speaking, steps 1108 and 1110 ensure that once a minimum fuel level in the tank has been reached, the scavenge system will be operational until more fuel is added to exceed the minimum required. After the scavenge system is turned on by opening up valve 128, the process moves back to step 1104 so that the fuel level is continually monitored.

The second situation where scavenge is turned on is for fuel temperature maintenance purposes. To that end, a step 1112 a determination is made as to whether the bulk fuel temperature is below some predetermined minimum. This Minimum Fuel Temperature (MFT) is likely be set at a level far enough above the freezing point for the fuel in use to avoid the risk of freezing. If, in step 1104, the temperature has not dropped below the MFT (the fuel is warm enough to not be in danger of freezing), the process returns to step 1102 and the scavenge system remains off. Again, the ordinary state of the scavenge system is off, rather than on like in the prior art systems.

But in step 1112 where the bulk fuel temperatures have dropped below the MFT, method 1100 activates the scavenge system (turns "on" in step 1110) even though the fuel is still above the level set for step 1104. This is because the heat added to the bulk fuel due to circulation of motive fuel back into the hopper provides the warming effect discussed above. Therefore, activating the scavenge system provides a useful way to keep bulk fuel temperatures away from freezing.

Thus, FIG. 11A presents not only the idea of leaving the scavenge system off as part of the fuel-temperature management scheme, but also that of turning the motive-flow-delivering scavenge system on when the fuel is relatively cold to help avoid temperature drift towards freezing.

Figure 11B:
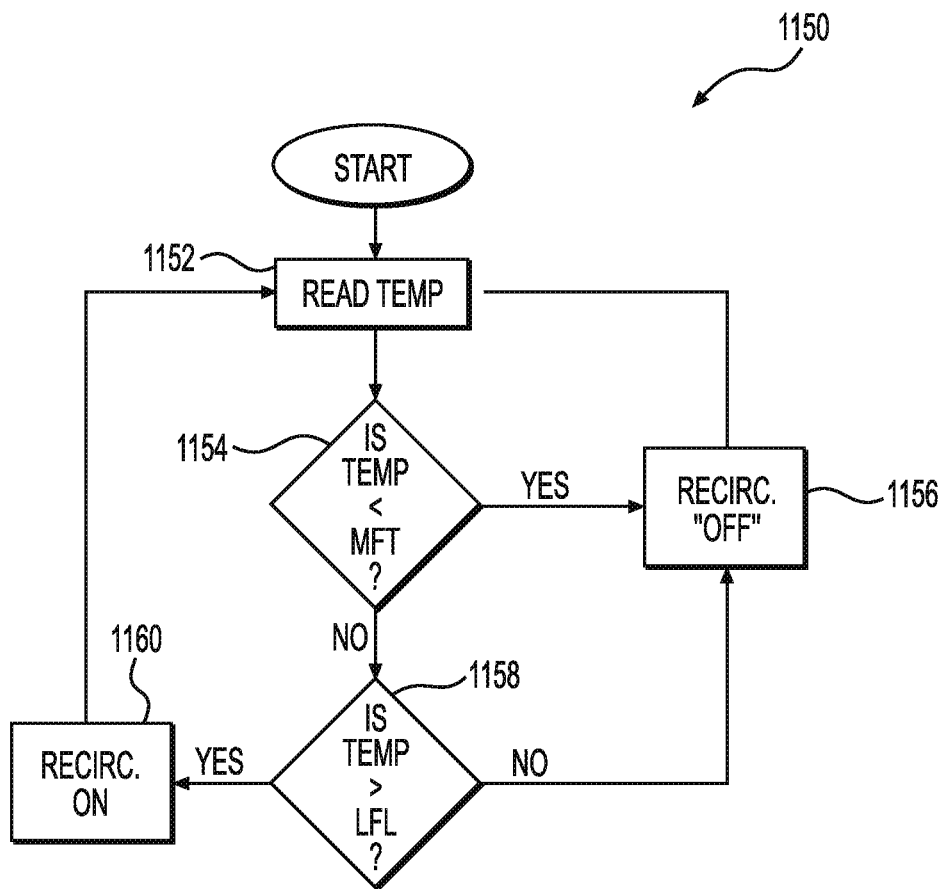
FIG. 11B is a flow diagram representing an embodiment for a high-level process for controlling a recirculation system to control fuel temperatures.
Figure 12:
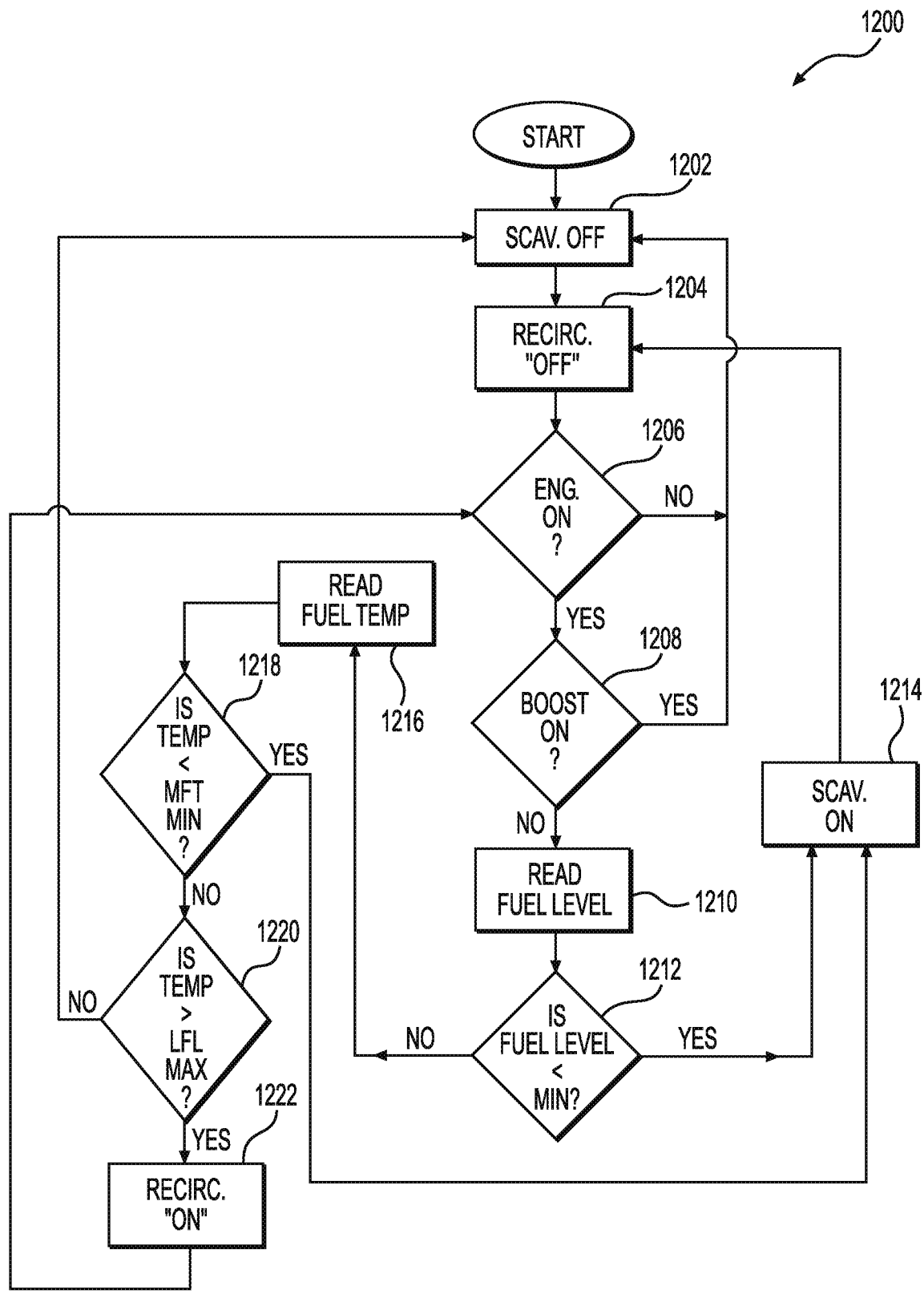
FIG. 12 is a more detailed combined process controlling the scavenge system and recirculation flow in a system like those shown in FIGS. 10 and 15 for bulk fuel temperature control.

FIG. 11B presents a flow diagram 1150 representing an embodiment for a high-level process for controlling a recirculation system to control fuel temperatures. The FIG. 11B processes can be operated independently from the scavenge process discussed for FIG. 11A, but the two processes can also be combined (as shown in FIG. 12).

After starting, a first step 1152 in FIG. 11B involves taking a bulk fuel temperature reading. Next, in a step 1154, it is determined whether the fuel temperature is less than the MFT. More specifically, the temperature management instructions 126 running on a processor 121 operate to determine if the temperature is cold enough to have drifted below the MFT predetermined as discussed above. In such a situation, there is no need for the cooling benefits of the recirculation system (e.g., pump 110, etc.).

If, however, in 1154, the temperature management instructions 126 running on a processor 121 determine that the temperature is above MFT, the process moves on to a step 1158, where a determination is made as to whether the fuel temperature is greater than a predetermined value related to the lower flammability limit (LFL) for the particular fuel being used. Normally a temperature below the LFL will be selected so that as the temperature rises, there will ample time to modulate the overall bulk temperatures downward so that there is statistically nil probability of LFL being reached. The fact that the answer in step 1158 is "yes" is an indication that there is a need for cooling the fuel, and the process moves on to next step 1160 where the recirculation system is turned on due to the elevated temperatures in the fuel.

The activation is accomplished by the controller 120 signaling to activate the recirculation pump 110 so that fuel from the tank is delivered from the lower points in the tank to the outboard outlets (170, 171, and 172, in FIGS. 6; 170, 171, 172, 173, and 174 in FIG. 7). When gravity causes the fuel to cascade down in the channels (180, 181, and 182 in FIGS. 6; 180, 181, 182, 183, and 184 in FIG. 7), this grants heat dissipation through the skin below each channel into the passing air outside the airfoil. The fuel then mixes back into the pool of fuel remaining in the tank, and the cooling will result in a lower bulk fuel temperature than existed before recirculation. Thus, over time, the continual cooling maintains fuel temperatures safely below the LFL.

After step 1160, the process returns to the temperature reading step 1152. Thus, due to the looping of the process, temperatures will be continually read, and the recirculation will be turned "off" when the temperatures drift below the MFT predetermined minimum, and "on" when the temperatures drift above the predetermined LFL maximum. Thus, the fuel temperature is compelled to remain within a predetermined temperature range.

FIG. 12 represents a more detailed combination of the broad concepts included in the scavenge and recirculation controls expressed in FIGS. 11A and 11B. A process 1200 depicted, in embodiments, running on the processor in the controller 120, the process 1200 being useful to maintain bulk fuel temperatures at acceptable levels. The process 1200 manages both the scavenge and the recirculation systems of the system of FIG. 10 (and optionally also FIG. 15). The FIG. 12 process can be stored as instructions included in the software 124. The process includes a method 1200 for controlling the state of the scavenge system valve 128 as well as for controlling the recirculation pump 110 to manage bulk fuel temperatures.

After starting, the process encounters first step 1202, where the scavenge system is initially off. To do this, the processor 121, executing shut off instructions 127, keeps the scavenge shut off valve 128 closed (see FIGS. 4 and 10). Because the scavenge system begins with valve 128 being closed, there is no flow to the scavenge ejectors 196, and thus, no hot motive fuel mix is dumped into the feed hopper 1012. Again, this is unlike conventional systems where the scavenge system simply runs continually.

In a next step 1204, the recirculation system is also initially off. As will be later revealed in the process of FIG. 12, these systems will be selectively controlled to maintain fuel temperatures.

With the scavenge and recirculation processes off as accomplished in preliminary steps 1202 and 1204, the process moves on to next step 1206, where a determination is made as to whether the engine is active/running or not. If the engine is off, the process will continually loop above to steps 1202, 1204, and 1206 as shown and the scavenge and recirculation systems remain off. But if the engine is on, the process moves on to a step 1208 where an inquiry is made as to whether the main fuel boost pump 190 is active (e.g., on takeoff). If the main fuel boost pump 190 is on, then the process loops again to step 1202, and the scavenge and recirculation systems remain off.

But if in step 1208 the boost pump is off, and the aircraft is relying completely on the motive-fuel driven main extraction fuel delivery pump 1002, the process moves on to a step 1210. In 1210, the fuel level inside the tank is read using the fuel level gauge 150.

After the reading is taken, an inquiry is made in a step 1212 as to whether the fuel level is below a minimum. Again, in the relevant conventional systems, the scavenge system is not actively controlled during flight, and is always on. It has been discovered, however, that by not using the scavenge system except during times of need, this significantly reduces the increase in temperature during operation of the aircraft. Thus, if in step 1212, the fuel level is determined to be less than the predetermined level at which the scavenge system becomes necessary, the process 1200 moves on to a step 1214 wherein the fuel scavenge system is turned "on". This involves the processor 121 opening up the scavenge on/off valve 128. Steps 1212 and 1214 ensure that once the minimum fuel level in the tank has been reached, the scavenge system will be operational until more fuel is added to exceed the minimum required. After the scavenge system is turned on by opening up valve 128, the process moves back to step 1204 so that as the process continues to loop, where the scavenge system remains on and the fuel level is continually monitored so that the scavenge system remains on until more fuel has been added.

If in step 1212, the fuel level is still above the critical predetermined minimum/cutoff, a fuel temperature reading is taken in a step 1216. After that reading is taken, e.g., using temperature gauge 152 located in the tank, the temperature management instructions 126 running on a processor 121 use the temperature sensed to determine, in a step 1218, whether the bulk fuel temperature is below MFT (e.g., the fuel temperature is getting relatively close to freezing). If, in step 1218, the temperature has not dropped below the MFT (the fuel is warm enough to not be in danger of freezing), the process returns to step 1214, and the scavenge system is turned on. The scavenge system is activated (in step 1214) adds heat to the bulk fuel due to circulation of the portion of motive fuel used to drive the scavenge extractor pumps 196 (see FIG. 10), and which ultimately is returned back into the hopper, creating a warming effect to counter the relatively low temperatures (again, the fuel is sub-MFT).

If in step 1218 the fuel temperature is above the preset MFT, the process moves on to a step 1220 where a determination is made as to whether the fuel temperature is greater than a predetermined value related to the LFL for the particular fuel being used. Normally a temperature considerably below the LFL will be selected so that as the temperature rises, there will ample time to reduce the overall bulk temperatures so that the actual LFL will never be reached.

If the fuel temperature is below the predetermined LFL maximum in step 1220, it is an indication that the temperature is within a desired range, and no cooling is necessary. The fact that the answer in step 1220 is "no" means there is no need for cooling the fuel, and the process loops back up to step 1202 where the scavenge and recirculation systems remain off until there is a state change. But if in step 1220 it is determined that the LFL maximum has been exceeded, the process moves on to a step 1222 where the recirculation system is turned on to cool the hot fuel. More specifically, controller 120 signals and activates dedicated recirculation pump 110 so that fuel from the tank is delivered to the outboard outlets (170, 171, and 172, in FIGS. 6; 170, 171, 172, 173, and 174 in FIG. 7) and gravity causes the fuel to cascade down in the channels (180, 181, and 182 in FIGS. 6; 180, 181, 182, 183, and 184 in FIG. 7). The resulting heat dissipation through the air-cooled skin below each channel reduces fuel temperatures overall.

With the recirculation system now active, the process after step 1222 loops back up/returns to step 1206 so that the recirculation system remains on and engine activity/boost pump status/fuel level, and fuel temperatures are continually monitored. The recirculation system will remain on until there is a relevant state change.

It should be mentioned that, in other embodiments, instead of a range, and the selections of a MFT and LFL maximum, a preset ideal temperature could be selected, and the processes of steps 1218-1222 be executed to maintain the temperature at a constant or within a small range of temperatures about the constant.

Figure 13:
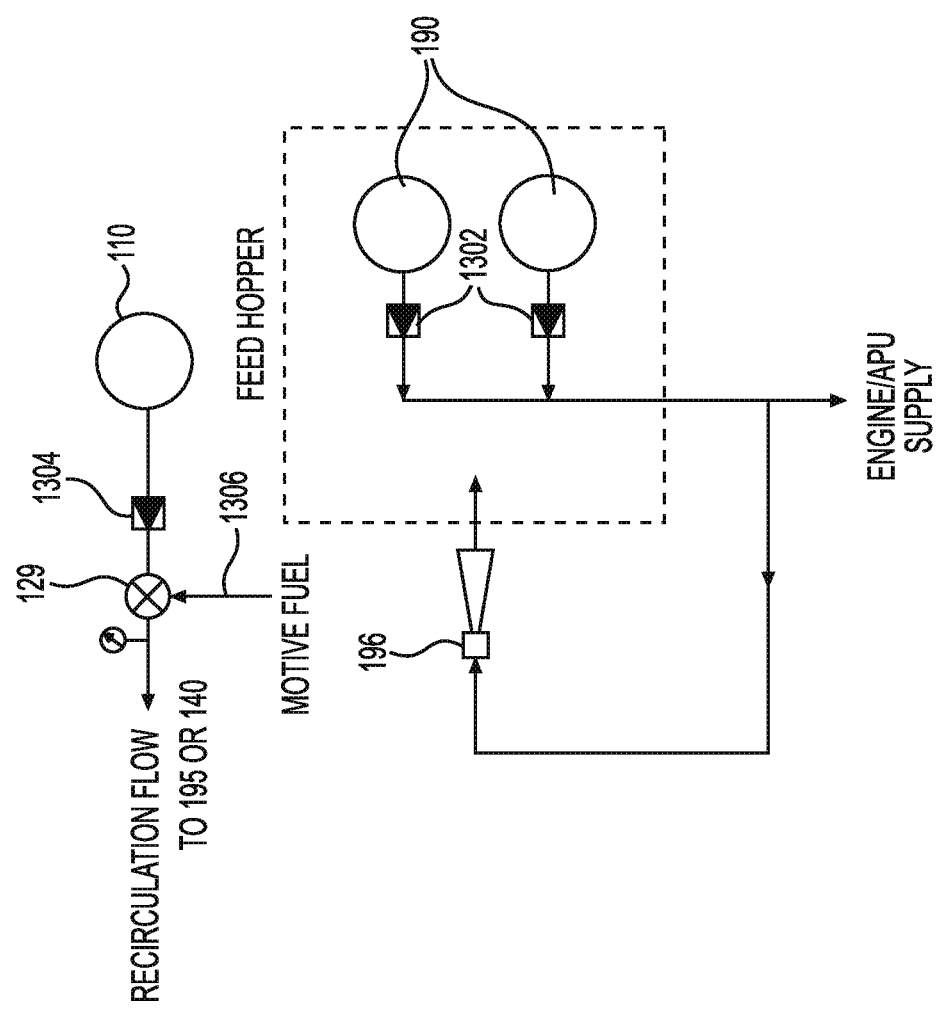
FIG. 13 shows another embodiment of a fuel supply architecture for supplying fuel to either of the fuel recirculation systems of FIG. 6 and FIG. 7.

FIG. 13 depicts a dedicated recirculation pump 110 system used to supply recirculation flow for an engine fuel supply system using the dual main fuel boost pumps 190. This sort of system, rather than using a single boost pump to back up an extraction pump (see, e.g., in FIG. 10), instead uses a main fuel boost pump pair 1390A and 1390B as the primary and only fuel supply source. Each pump in the pair is directed into respective check valve 1302. In these systems, the scavenger ejector pump 196 is not connected to the motive flow system. Instead, the motive flow is normally directed back into the feed hopper thus contributing to the bulk fuel in the tank.

A modulation valve 129 has been installed downstream from a check valve 1304 at the recirculation pump 110 output. The modulation valve 1304 (could be valve 128 shown in FIG. 4) is controlled by the controller 120 which, using processor 121, executes temperature management instructions 126 along with flow control instructions 125. These instructions, in embodiments, could include a process shown in FIG. 14, which are useful in controlling the bulk fuel temperature by either shutting off or modulating the recirculation flow and/or modulating the flow of warm motive fuel into the recirculation line, for example fuel recirculation lines 140, 640, 740 or alternatively refuel line 195.

Figure 14:
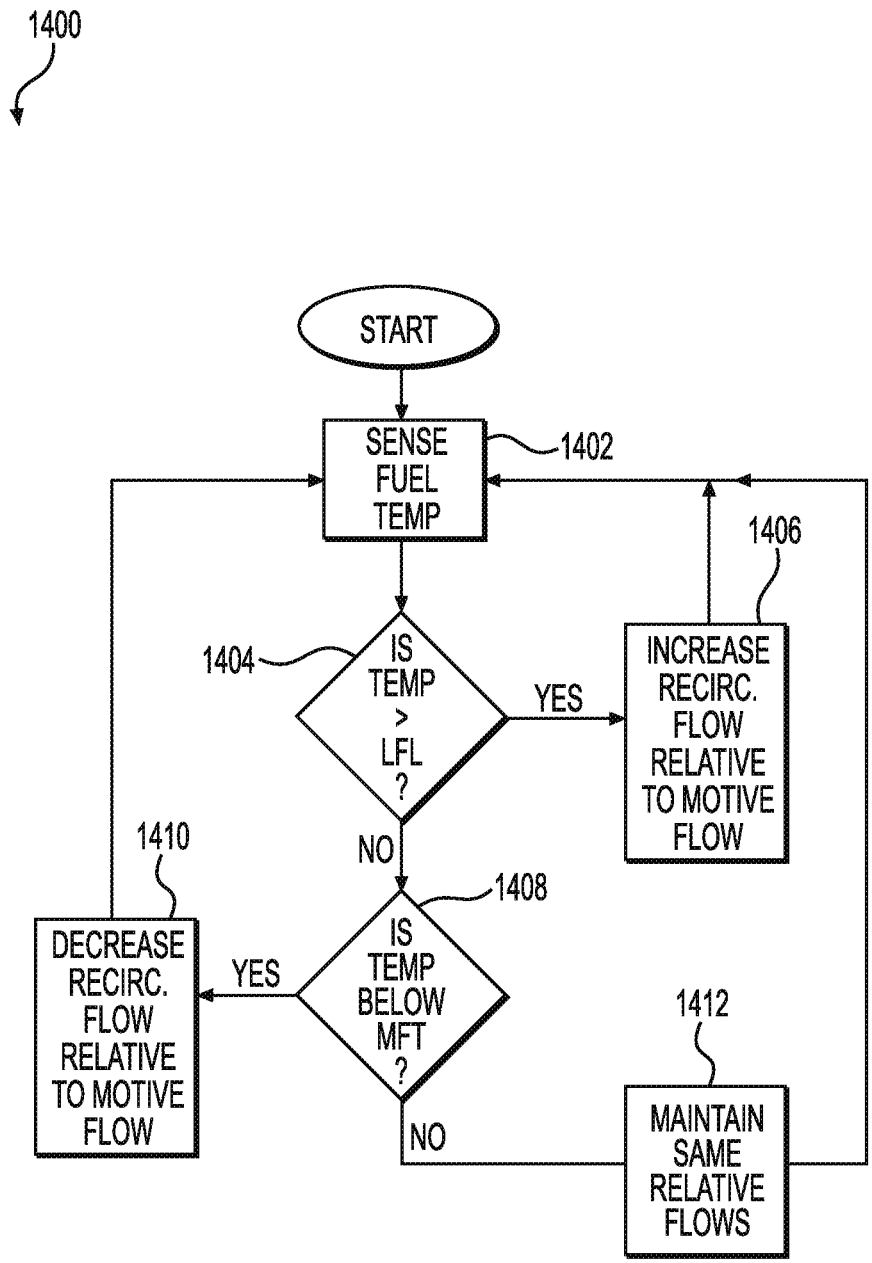
FIG. 14 depicts an embodiment for a process for using recirculation flow to control bulk fuel temperatures in a system incorporating a fuel supply arrangement like that disclosed in FIG. 13.

FIG. 14 shows an embodiment for a process 1400 executable for the FIG. 13 kind of fuel delivery system (which rely on boost pumps as the primary mode for fuel delivery). Because this system does not have motive flow incorporated into driving the scavenge extraction pumps, there is no need to deal with the motive flow in the scavenge system.

Upon starting up, the process 1400 has a first step 1402 which involves sensing the temperature of the bulk fuel (e.g., using temperature gauge 152). Once the reading is made according to the temperature management instructions 126 running on processor 121, the information is used in a next step 1404 whether the bulk fuel temperature is above the predetermined MFT (e.g., an indication that the fuel temperature is relatively high). If, in step 1404 the temperature has escalated above the MFT, the process moves on to a step 1406. In step 1406, instructions in software 124 instruct the valve 129 (see FIG. 13) to open up motive flow from line 1306 relative to the flow received from dedicated recirculation pump 110 (e.g., an increment change is made in relative flows favoring motive). The motive flow otherwise dumps into the bulk fuel in the tank, thus, the increase in circulation will provide overall cooling. This is because the hot motive fuel will be delivered to the outboard outlets (170, 171, and 172, in FIGS. 6; 170, 171, 172, 173, and 174 in FIG. 7) using one of lines 140, 640, 740 or refuel line 195. Gravity causes the fuel to cascade down in the channels (180, 181, and 182 in FIGS. 6; 180, 181, 182, 183, and 184 in FIG. 7). The resulting heat dissipation through the air-cooled skin below each channel reduces fuel temperatures overall. Once the relative flow of motive versus recirculation pump fuel has been increased an increment, the process loops back up to step 1402. There will be, optionally, a time delay created between increments such that the valve 129 does not become immediately completely open to motive fuel. The process 1400 loops between steps 1402, 1404, and 1406 until there is a state change.

If, in step 1404, the fuel temperature detected is not greater than the predetermined LFL, the process moves on to a step 1408 where an inquiry is made as to whether the temperature is below the preselected MFT. To do so, temperature management instructions 126 running on a processor 121 use the temperature sensed to determine, in step 1402, whether the bulk fuel temperature is below MFT (e.g., the fuel temperature is too close to freezing).

If, in step 1408, the temperature sensed in the tank has dropped below MFT, the process moves on to a step 1410 where the recirculation flow from pump 110 is decreased relative to the motive flow from line 1306 by making an incremental adjustment of the position of valve 129. This results in the motive flow continuing to dump directly into the fuel tank, serving to warm the bulk fuel temperatures. If, in step 1408, the temperature has not dropped below the MFT, the process moves on to a step 1412, where the valve 129 remains in position (is not changed). Both of steps 1410 and 1412 loop back up to the top of the process 1400 where the fuel temperature is continually sensed and stays within the range prescribed between the predetermined MFT and LFL values. Alternatively, the process could be configured to cause the fuel to be compelled to a single ideal temperature value (e.g., a temperature about half the difference between the MFT and LFL). But in some instances it is preferable to use a range to avoid unnecessary operation of equipment when there is not a thermal need.

FIG. 15 depicts an engine feed hopper of an engine fuel supply system that uses engine motive flow and a primary ejector main pump and is pressurized by the scavenger ejector pump 196 of the fuel scavenge system. A hopper vent line supplies the recirculation flow to fuel recirculation line 740 (FIG. 7) or refuel line 195 (FIG. 6). When the fuel level drops below a predetermined threshold level, controller 120 sends a signal to fuel scavenge shutoff valve 128 to open, allowing the engine supply flow to power the fuel scavenge system. The main fuel boost pump 1590 and scavenge shutoff valve 128 may be used to control bulk fuel temperature, for example via controller 120 using instructions for fuel temperature management 126 of FIG. 4.

Figure 16:
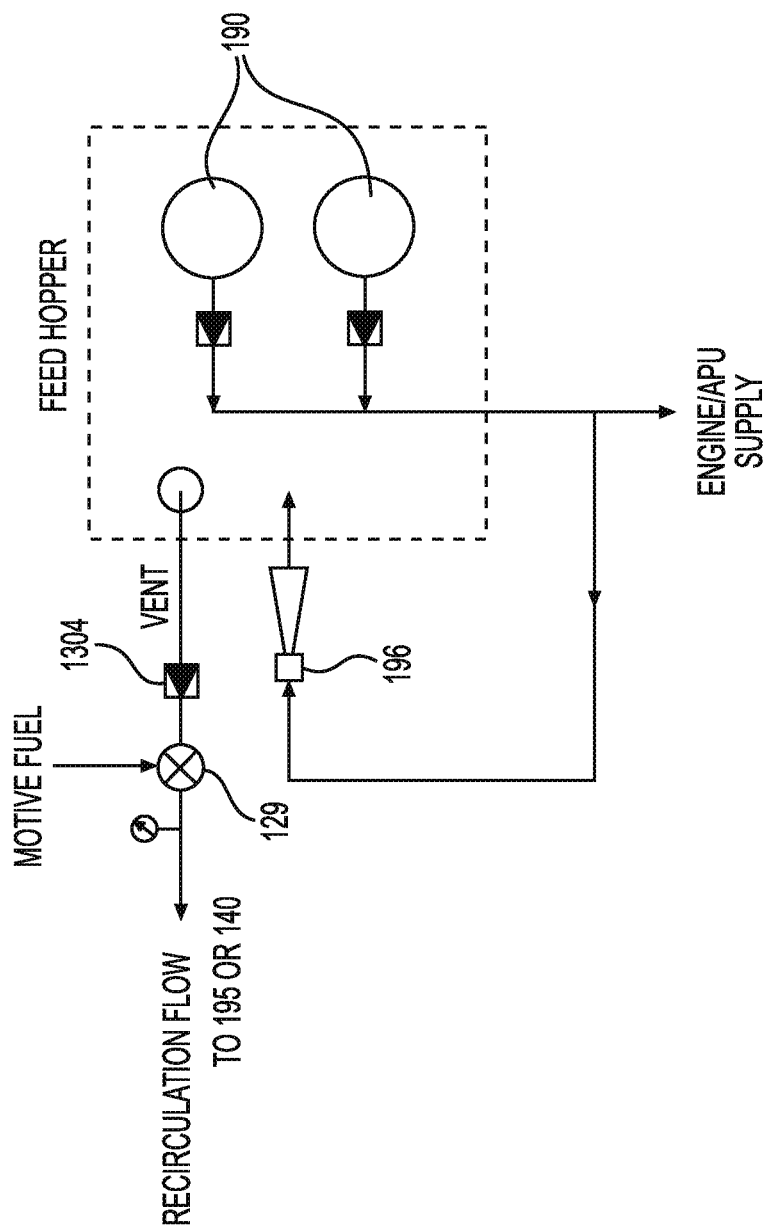
FIG. 16 shows still another embodiment of a fuel supply architecture for supplying fuel to either of the fuel recirculation systems of FIG. 6 and FIG. 7.

FIG. 16 depicts an engine feed hopper of an engine fuel supply system that uses dual main fuel boost pumps 1690A and 1690B and is pressurized by the scavenger ejector pump 196 of the scavenge system. A hopper vent line supplies the recirculation flow to fuel recirculation line 740 (FIG. 7) or refuel line 195 (FIG. 6). Valve 129 may be used to control the bulk fuel temperature by shutting off or modulating the recirculation flow and/or modulating the flow of warm motive fuel under control of controller 120 using instructions for fuel temperature management 126 of FIG. 4, for example.

Figure 17:
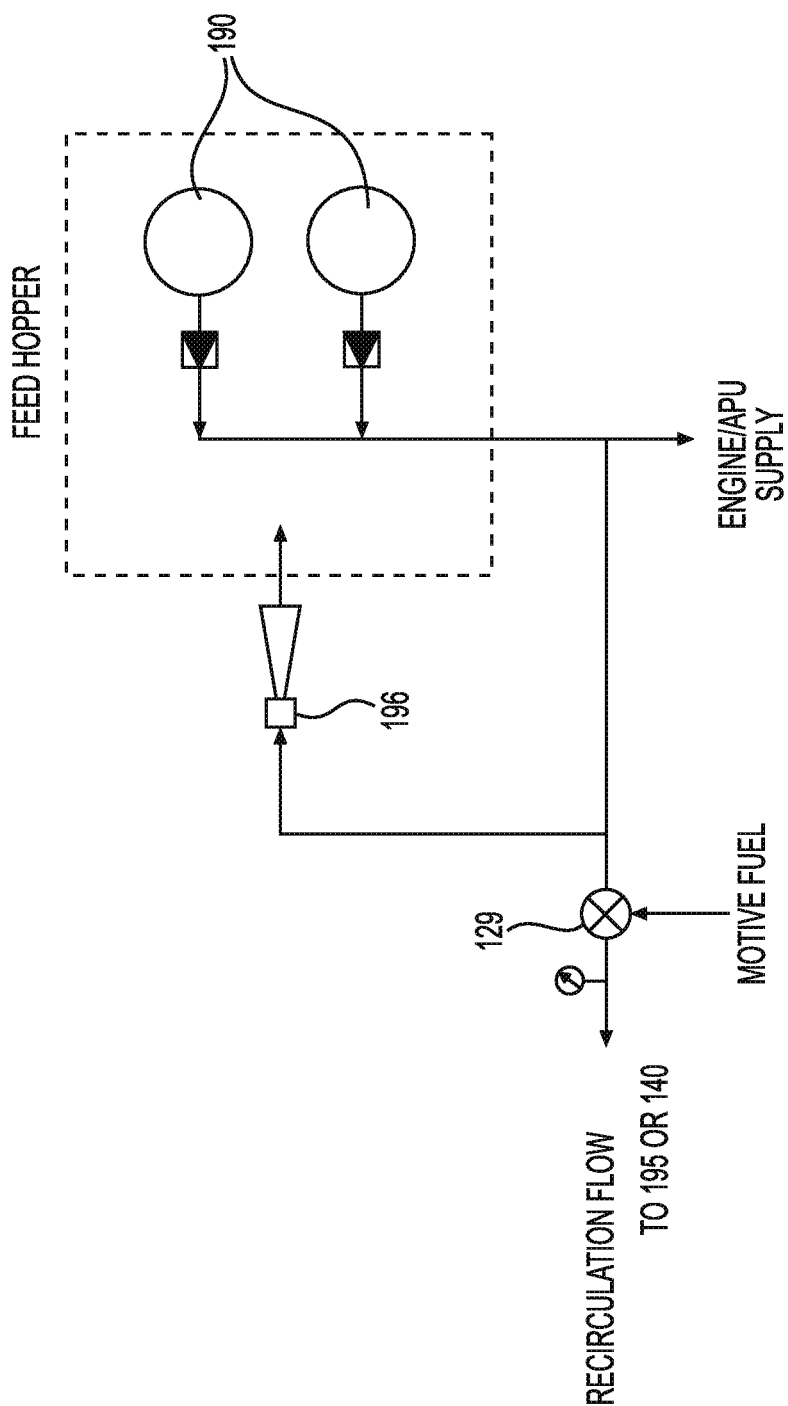
FIG. 17 shows an additional embodiment of a fuel supply architecture for supplying fuel to either of the fuel recirculation systems of FIG. 6 and FIG. 7.

FIG. 17 depicts an engine fuel supply system that uses dual main fuel boost pumps 1790A and 1790B where the recirculation flow to fuel recirculation line 740 (FIG. 7) or refuel line 195 (FIG. 6) is branched off from the fuel supply plumbing. Valve 129 may be used to control the bulk fuel temperature by shutting off or modulating the recirculation flow and/or modulating the flow of warm motive fuel under control of controller 120 using instructions for fuel temperature management 126 of FIG. 4, for example.

Although the processes expressed in FIGS. 11A, 11B, 12, and 14 as being for one tank, it should be understood that the same processes independently could be executed independently in the other tank. Further, it should be understood that a single system could be used to serve both tanks together (e.g., a single recirculation pump that delivers fuel to both wings) as well as numerous other variations.

Further, it should be understood that all of the systems shown in FIGS. 2, 4-10, 13, and 15-17 would be, in embodiments, duplicated symmetrically on the other side of the aircraft as is evident in view of the illustration in FIG. 1. Thus, these systems are all, in embodiments, symmetrical, but not necessarily so.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and sub-combinations are of utility and may be employed without reference to other features and sub-combinations and are contemplated within the scope of the claims. Not all steps listed in the various figures need be carried out in the specific order described.

What is claimed is:

1. A fuel system for an aircraft, the fuel system comprising:
 a fuel-temperature-control system for maintaining fuel temperatures in the fuel system, the fuel temperature-control system including a controller;
 a temperature-reading device located in the fuel system;
 a circulation-flow delivery subsystem, the circulation-flow delivery subsystem delivering fuel to a plurality of heat dissipating channels at an outboard section of an aircraft wing via a plurality of delivery conduits, wherein each heat dissipating channel of the plurality of heat dissipating channels is paired with a fuel outlet on each delivery conduit in the plurality of delivery conduits to deliver fuel to each heat dissipating channel, wherein the plurality of heat dissipating channels exchange heat through an aircraft skin into an environment outside the aircraft wing;
 a return arrangement returning fuel from the plurality of heat dissipating channels;
 the controller being configured to activate the circulation-flow delivery subsystem upon a detection of a first reading made by the temperature-reading device, the first reading being reflective of a first fuel temperature which is either greater than or equal to a predetermined temperature maximum, the predetermined temperature maximum reflecting a fuel-cooling need.

2. The fuel system of claim 1 wherein the controller is further configured to deactivate the circulation-flow delivery subsystem upon detection of a second reading made by the temperature-reading device, the second reading reflecting a second temperature which is either less than or equal to a predetermined temperature minimum, the predetermined temperature minimum being reflective of a fuel-warming need.

3. The fuel system of claim 1 comprising:
 a scavenge system, the scavenge system adapted to direct fuel from one or more low points in a fuel vessel in the fuel system to a feed hopper;
 a level-reading device in the fuel vessel;
 the controller being further configured to bring the scavenge system from an inactive state to an active state upon detection that a fuel level is either equal to or has fallen below a predetermined minimum level.

4. The fuel system of claim 1 comprising:
 the controller being configured to, when an engine is operating, determine whether a boost pump is operating as a primary source of fuel for the engine, and if the boost pump is operational, turning off either or both of a scavenge system or the circulation-flow delivery device if either or both are on.

5. The fuel system of claim 1 wherein the circulation-flow delivery subsystem includes a pump.

6. The fuel system of claim 5 wherein the pump is dedicated to the delivery of fuel to the plurality of heat dissipating channels.

7. The fuel system of claim 1 including a junction where motive flow from an engine is made to be combinable with the fuel being delivered to the plurality of heat dissipating channels, the fuel system further comprising:
- a modulation process operating on the controller, the modulation process, upon a plurality of subsequent fuel temperature readings, increasing a flow of the fuel being delivered to the plurality of heat dissipating channels relative to an amount of motive flow upon elevated temperature detections.

8. The fuel system of claim 7 wherein the modulation process, upon low temperature detections, decreases the flow of the fuel being delivered to the plurality of heat dissipating channels relative to the amount of motive flow.

9. The fuel system of claim 1 wherein the aircraft skin is located on an underside of an aircraft wing.

10. The fuel system of claim 9 wherein the aircraft skin located on the underside of the aircraft wing defines internal surfaces of a fuel tank.

11. The system of claim 10 wherein the circulation-flow delivery subsystem includes a fuel conduit that runs from an inboard location in the fuel tank and delivers the fuel to the outboard location inside the fuel tank, the inboard location in the tank being lower than the outboard location.

12. The system of claim 11 wherein the fuel flows back towards the inboard location under an influence of gravity.

13. The system of claim 12 wherein the fuel flows back towards the inboard location through at least one channel being at least partially defined by longitudinally-extending structural configurations rising from a lower skin of the wing.

14. A method for maintaining temperatures in an aircraft, the aircraft having symmetrical fuel tanks, each tank being defined by an internal surface of a wing, the method comprising:
- on detection of a fuel temperature which needs to be cooled to a lower temperature, circulating fuel from an inboard region in each fuel tank to a plurality of heat dissipating channels located at an outer region in each fuel tank such that the fuel flows back to the inboard region under an influence of gravity from the outer region, a lower portion of each wing serving to dissipate heat from the fuel being circulated,
- wherein each heat dissipating channel of the plurality of heat dissipating channels is paired with one fuel outlet to deliver fuel to the heat dissipating channel.

15. The method of claim 14 comprising:
- maintaining a fuel scavenge system in an off state; and
- activating the fuel scavenge system upon the detection of a fuel level in a wing fuel tank falling below a preselected minimum.

16. A control process for maintaining acceptable fuel temperatures in a fuel system, the fuel system including a scavenging system, the scavenging system when subjected to motive flow from an engine (i) operating at least one extraction pump; and (ii) returning the motive fuel to a fuel tank, the control process comprising:
- beginning with motive flow to the scavenging system turned off;
- continually reading a fuel level and a fuel temperature in the fuel tank; and
- activating the scavenge system by opening up motive flow to a conduit feeding the scavenge system upon receiving a first level indication reflecting the fuel level has reached or fallen below a predetermined minimum level, or upon receiving a temperature reading indicating that the fuel temperature has reached a predetermined minimum temperature,
- transferring the motive flow from the fuel tank to a plurality of heat dissipating channels located at an outboard section of an aircraft wing,
- wherein each channel of the plurality of heat dissipating channels is paired with one fuel outlet to deliver fuel to the heat dissipating channel,
- maintaining fuel temperatures using the beginning and activating steps above.

17. The control process of claim 16 comprising:
- deactivating the scavenge system by stopping motive flow upon the fuel level in the fuel tank rising back above the predetermined minimum level or some other predetermined level.

18. The control process of claim 17 comprising:
- disposing a valve in the conduit feeding the scavenge system for executing the activating and deactivating steps.

19. The control process of claim 16 comprising:
- executing the activating step even if the fuel level remains above the predetermined minimum level.

* * * * *